United States Patent
Kobayashi et al.

(10) Patent No.: US 9,551,982 B2
(45) Date of Patent: Jan. 24, 2017

(54) WATER TREATMENT CONTROL APPARATUS AND WATER TREATMENT SYSTEM

(71) Applicant: Kabushiki Kaisha Toshiba, Minato-ku (JP)

(72) Inventors: Hisashi Kobayashi, Kawaguchi (JP); Yoshitaka Kobayashi, Kawasaki (JP); Tetsuya Shinohara, Ichikawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 409 days.

(21) Appl. No.: 14/166,069

(22) Filed: Jan. 28, 2014

(65) Prior Publication Data

US 2014/0324223 A1    Oct. 30, 2014

Related U.S. Application Data

(63) Continuation of application No. PCT/JP2013/083667, filed on Dec. 16, 2013.

(30) Foreign Application Priority Data

Apr. 26, 2013  (JP) .................................. 2013-094510

(51) Int. Cl.
*C02F 1/00* (2006.01)
*B01D 17/12* (2006.01)
(Continued)

(52) U.S. Cl.
CPC ............... *G05B 15/02* (2013.01); *B01D 17/12* (2013.01); *C02F 1/008* (2013.01);
(Continued)

(58) Field of Classification Search
CPC ............... C02F 1/008; C02F 2103/001; C02F 2103/002; C02F 2103/003; C02F 2103/007; C02F 2301/04; C02F 2307/14; C02F 2209/005; C02F 2209/006; C02F 2209/40; C02F 2209/42; C02F 2303/22; B01D 17/12; B01D 2221/00; B01D 2221/12; G05B 15/02; G05B 2219/2605; G05D 7/00; G05D 7/06; G06F 17/00; G06F 17/30; G06F 19/00
(Continued)

(56) References Cited

U.S. PATENT DOCUMENTS

2005/0045228 A1   3/2005   Labrador
2010/0042420 A1*  2/2010   Hutchinson ............ G06Q 10/06
                                                                 705/1.1
(Continued)

FOREIGN PATENT DOCUMENTS

CN        1779711 A      5/2006
CN        1847169 A     10/2006
(Continued)

OTHER PUBLICATIONS

Publication: "Water Recycling and Reuse: The Environmental Benefits", United States Environmental Agency (EPA), Water Division Region IX-EPA 909-F-98-001, Published 1998.*
(Continued)

*Primary Examiner* — Joseph Drodge
(74) *Attorney, Agent, or Firm* — Oblon, McClelland, Maier & Neustadt, L.L.P.

(57) ABSTRACT

According to one embodiment, a water treatment control apparatus generates an indication to a water treatment facility referring to conditions including a drought status and a water treatment cost at the water treatment facility. The indication indicates a type of water to be taken by the water
(Continued)

treatment facility between a plurality of types of water including river water from rivers, rainwater, and waste water used by a customer.

9 Claims, 24 Drawing Sheets

(51) Int. Cl.
G05D 7/00 (2006.01)
G05B 15/02 (2006.01)
C02F 103/00 (2006.01)

(52) U.S. Cl.
CPC .. C02F 2103/007 (2013.01); C02F 2209/005 (2013.01); C02F 2209/006 (2013.01); C02F 2209/40 (2013.01); C02F 2209/42 (2013.01); C02F 2303/22 (2013.01); C02F 2307/14 (2013.01); G05B 2219/2605 (2013.01)

(58) Field of Classification Search
USPC ............... 210/94, 143, 541, 542, 614, 739, 918,210/919; 700/273, 275, 282; 705/1.1, 400, 412, 705/413
See application file for complete search history.

(56) References Cited

U.S. PATENT DOCUMENTS

| | | | |
|---|---|---|---|
| 2010/0122739 A1* | 5/2010 | Williamson | C02F 1/008 137/395 |
| 2011/0046792 A1* | 2/2011 | Imes | F24F 11/0086 700/278 |
| 2011/0050395 A1* | 3/2011 | Ervin | F17D 5/02 340/6.11 |
| 2012/0323380 A1 | 12/2012 | Kobayashi et al. | |
| 2013/0226752 A1* | 8/2013 | Moriya | G06Q 30/0207 705/34 |
| 2014/0262982 A1* | 9/2014 | Bailin | C02F 9/00 210/85 |
| 2015/0021247 A1* | 1/2015 | Lin-Hendel | E03B 1/041 210/143 |

FOREIGN PATENT DOCUMENTS

| | | |
|---|---|---|
| JP | 7-119184 A | 5/1995 |
| JP | 2001-55763 A | 2/2001 |
| JP | 2010-256333 | 11/2010 |
| JP | 2013-2091 | 1/2013 |
| WO | WO 2012-160535 A2 | 11/2012 |

OTHER PUBLICATIONS

Publication: "Costs and Benefits of Complete Water Treatment Plant Automation", Roberts et al, Published by American Water Works Association (AWWA), Published 2008.*
Publication: "The implications of projected climate change for freshwater resources and their management", Z. W. Kundzewicz et al., Published by Hydrological Sciences Journal, vol. 53 (1), Feb. 2008., pp. 3-10.*
Singapore Search Report and Written Opinion issued on Jan. 26, 2016 in Patent Application No. 11201501346S.
International Search Report issued Mar. 18, 2014 in PCT/JP2013/083667 (submitting English translation only).
Extended European Search Report issued in European Patent Application No. 13882886.8 dated Sep. 22, 2016.

* cited by examiner

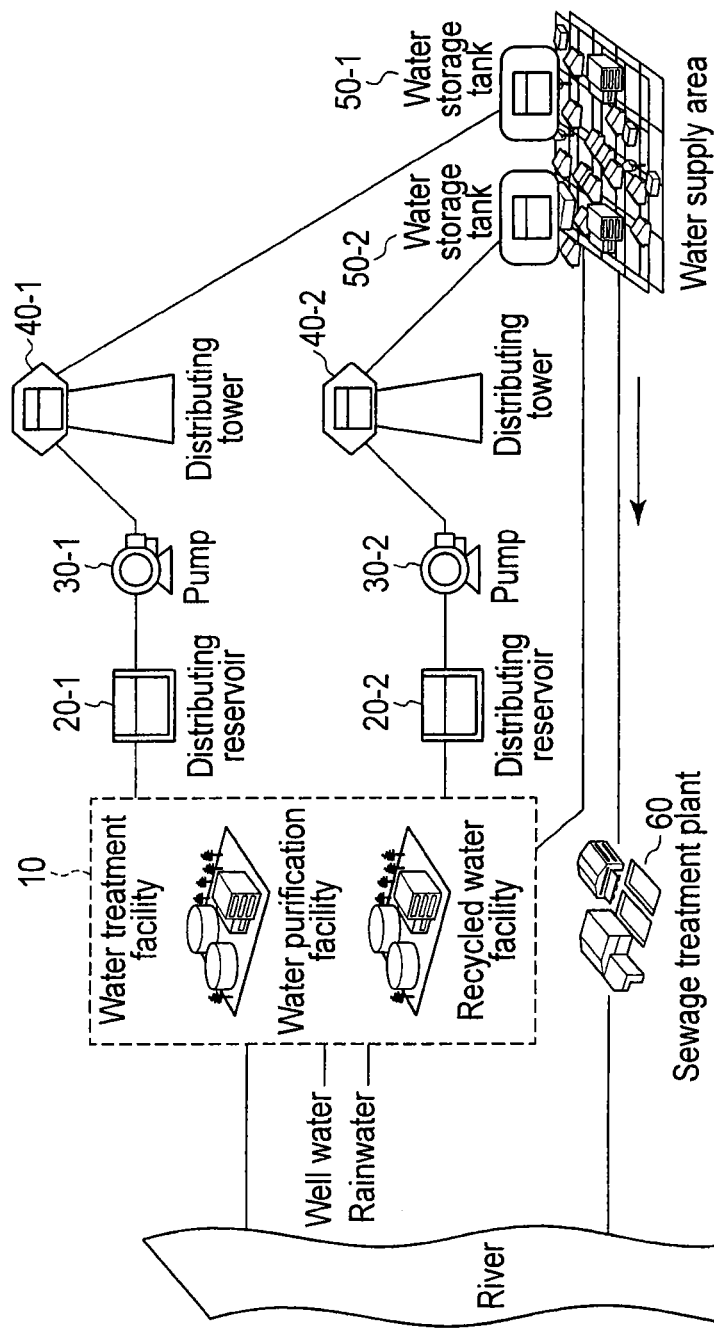
F I G. 1

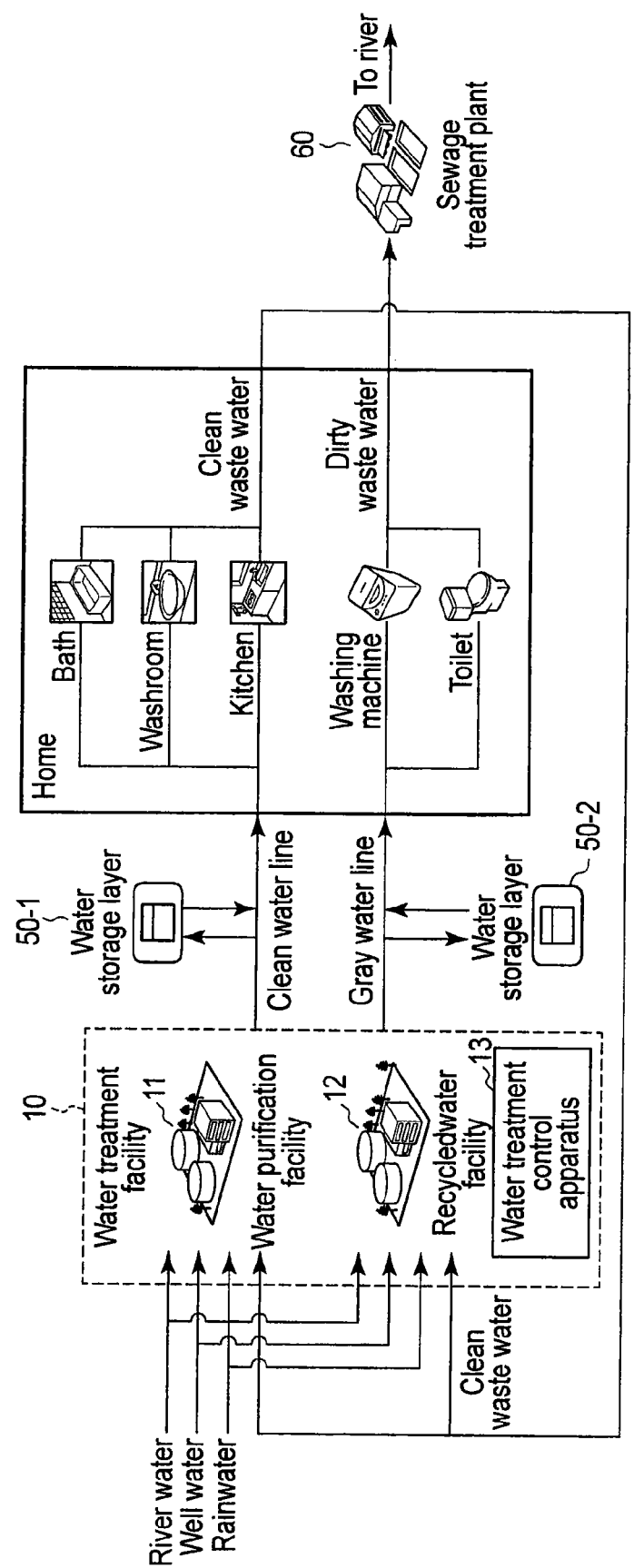
F I G. 2

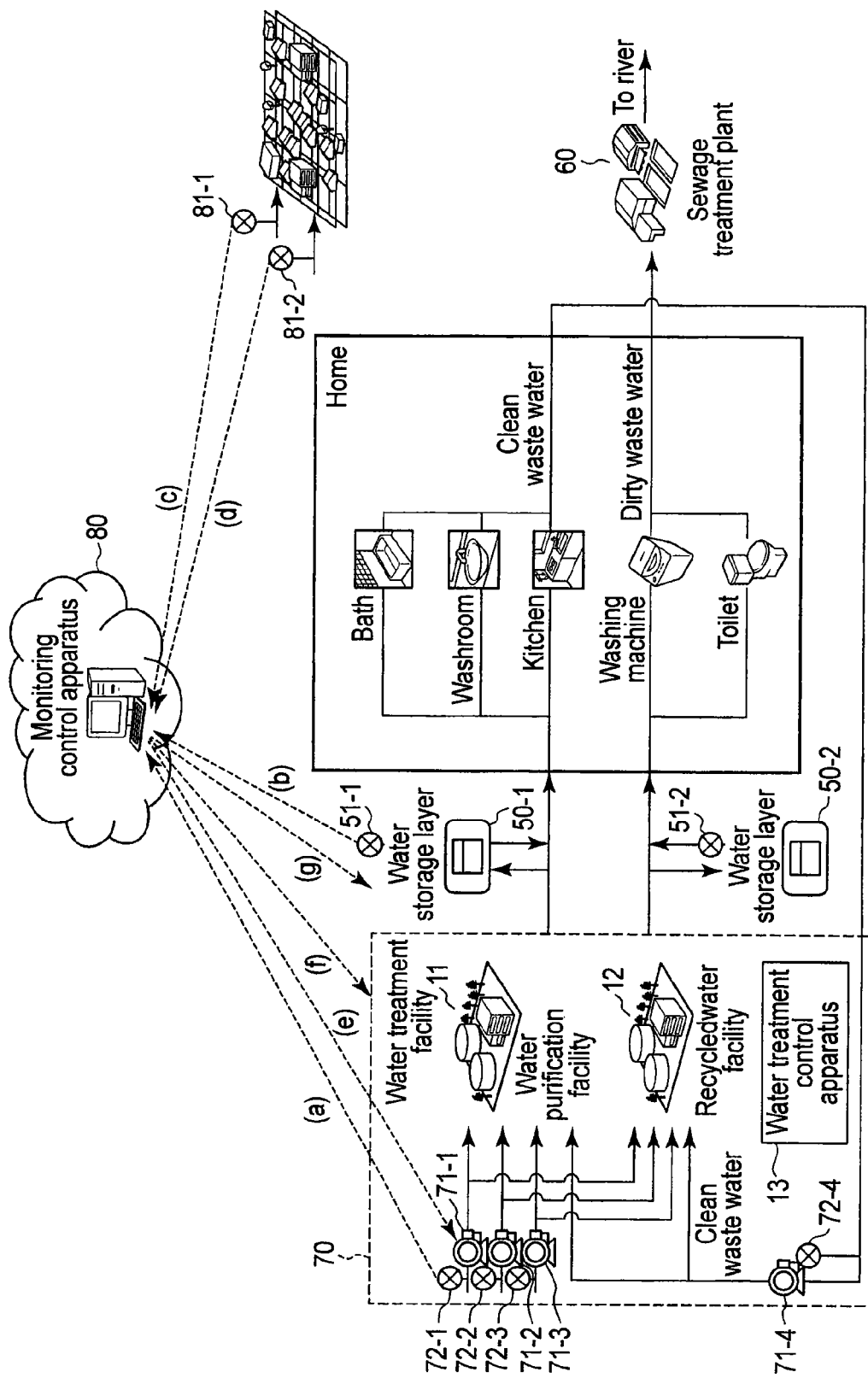
F I G. 3

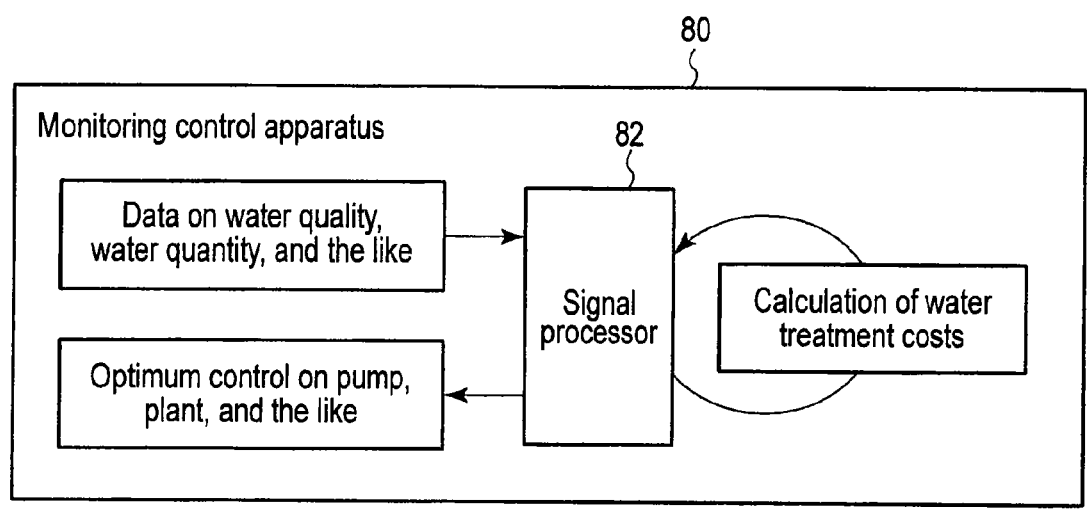
F I G. 4

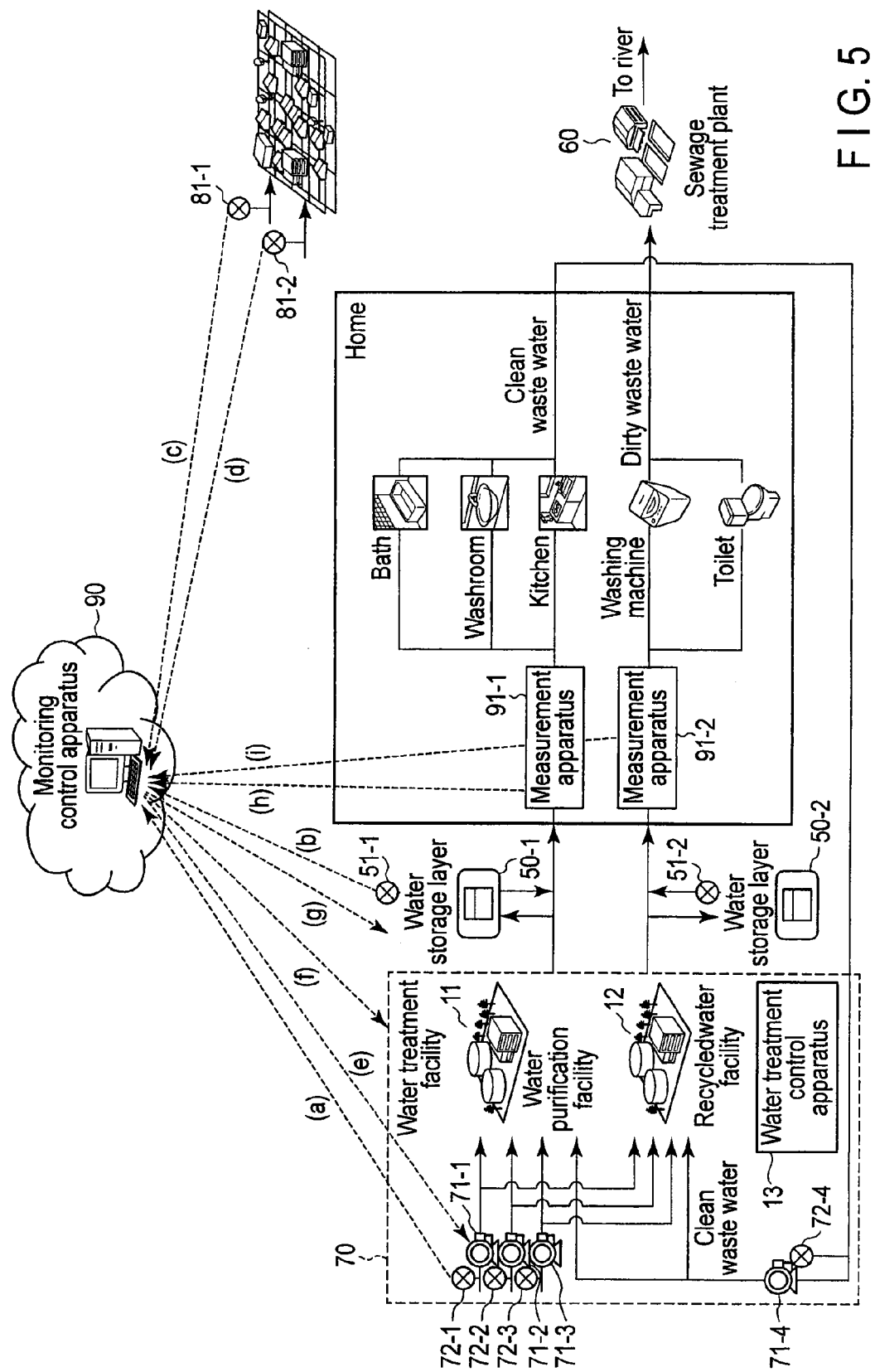
F I G. 5

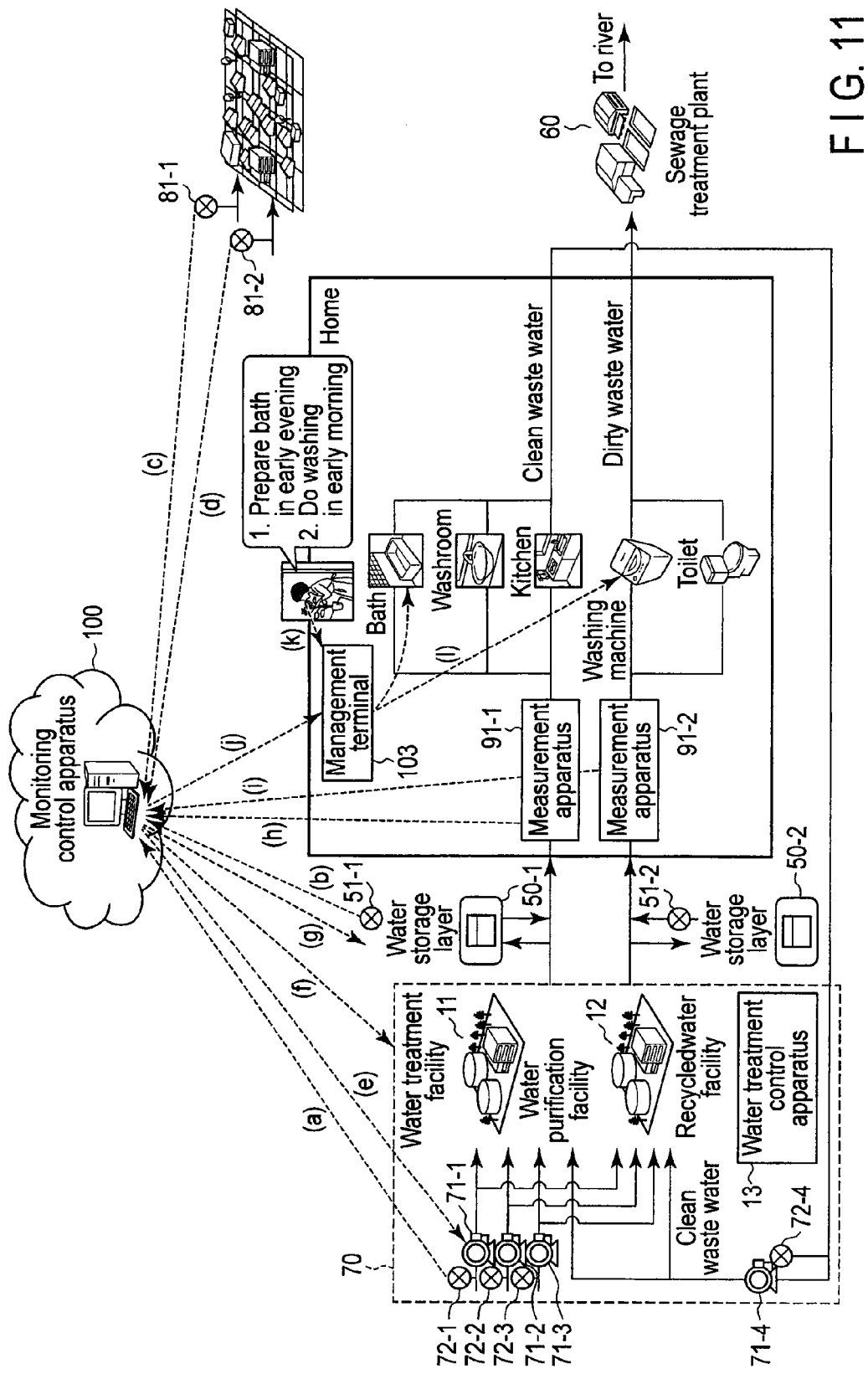
F I G. 11

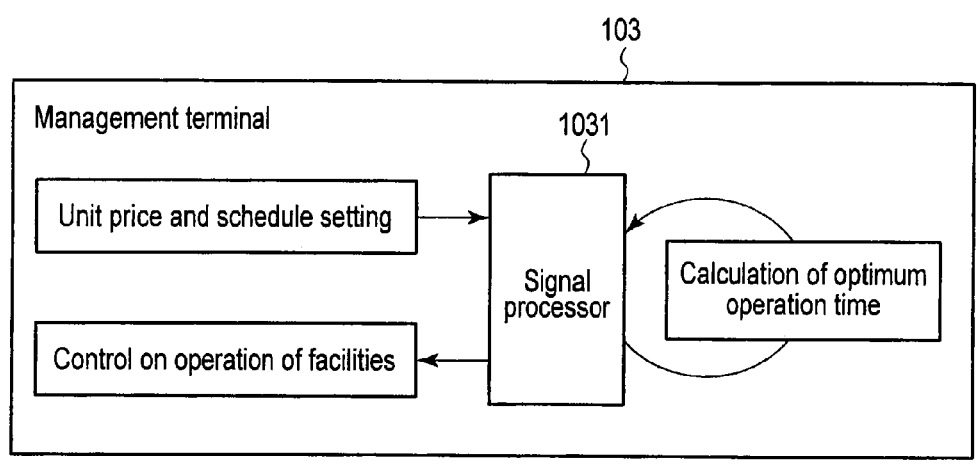
F I G. 12

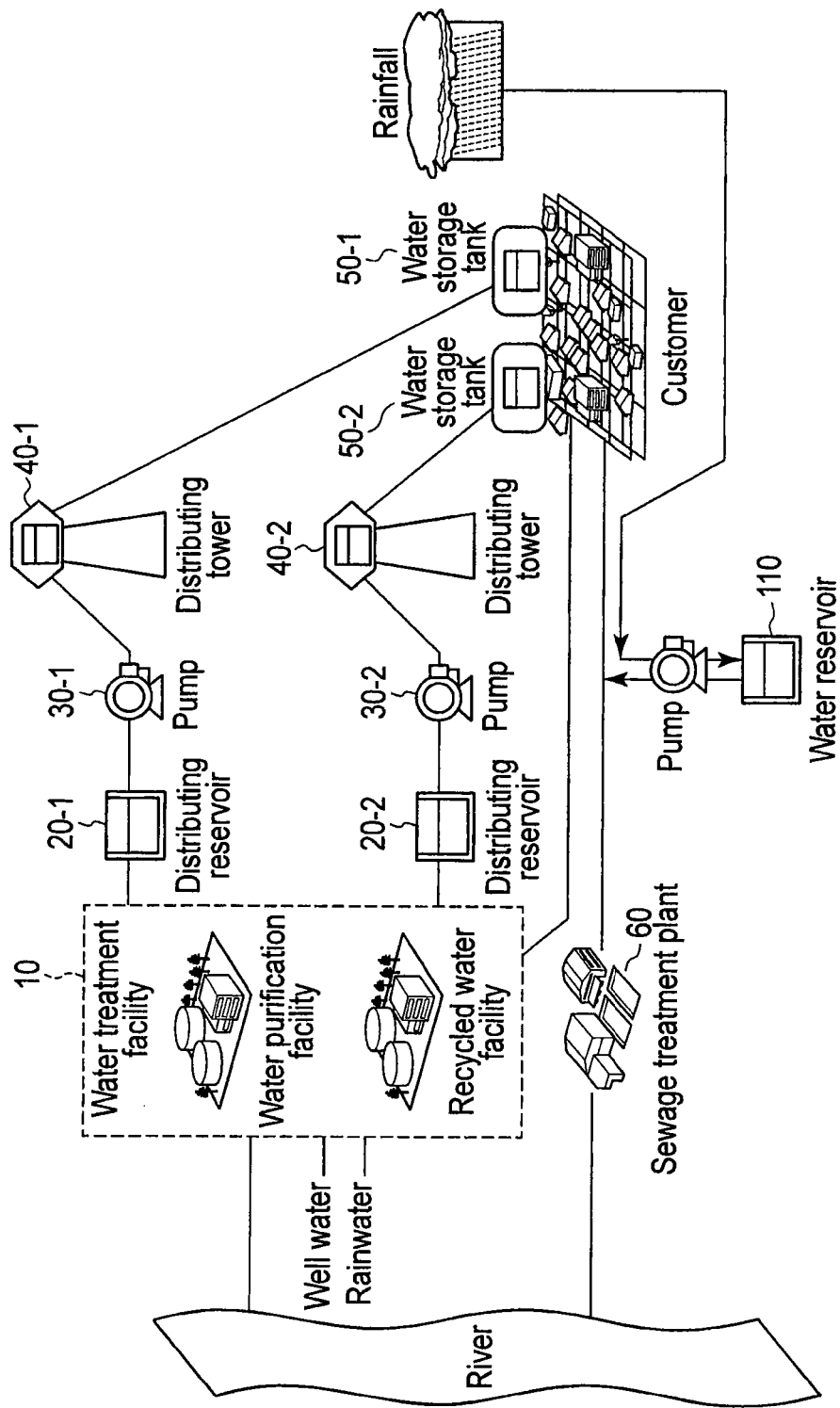
F I G. 19

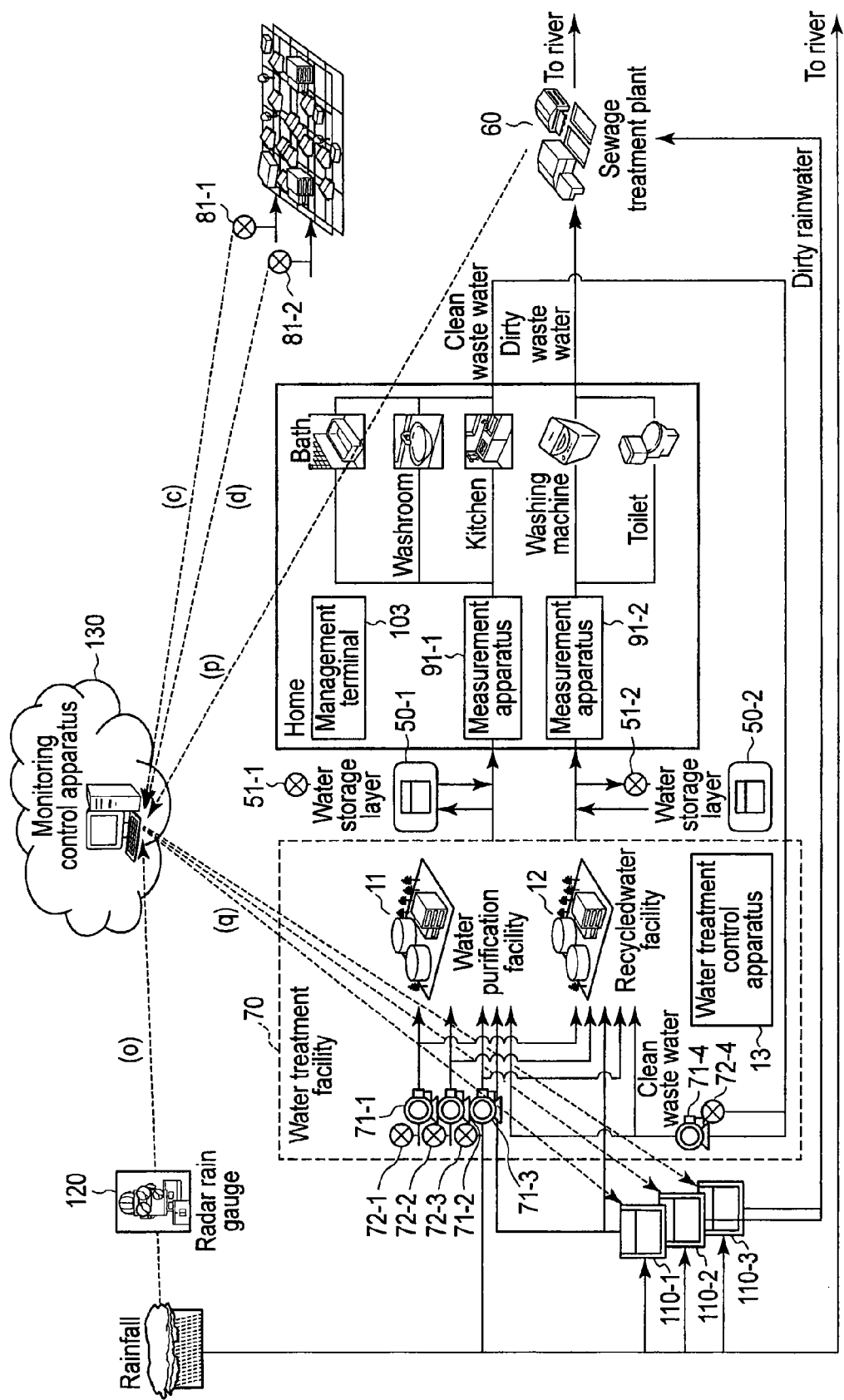
F I G. 20

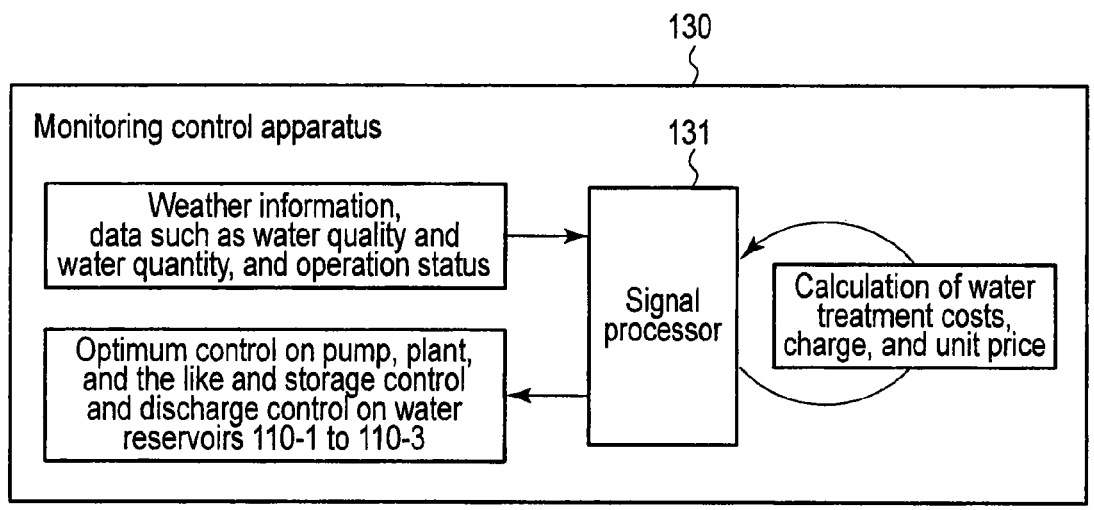
F I G. 21

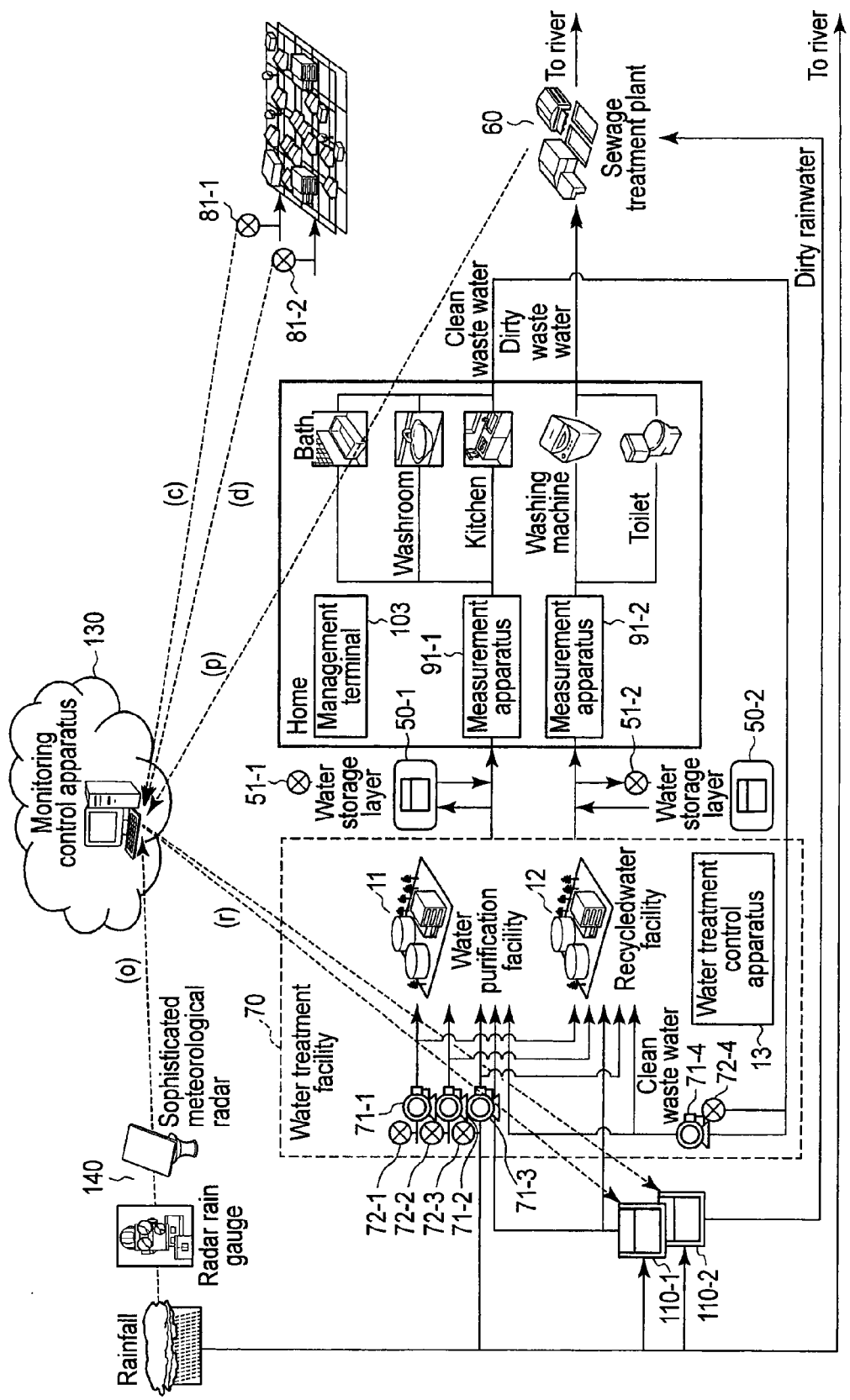
F I G. 22

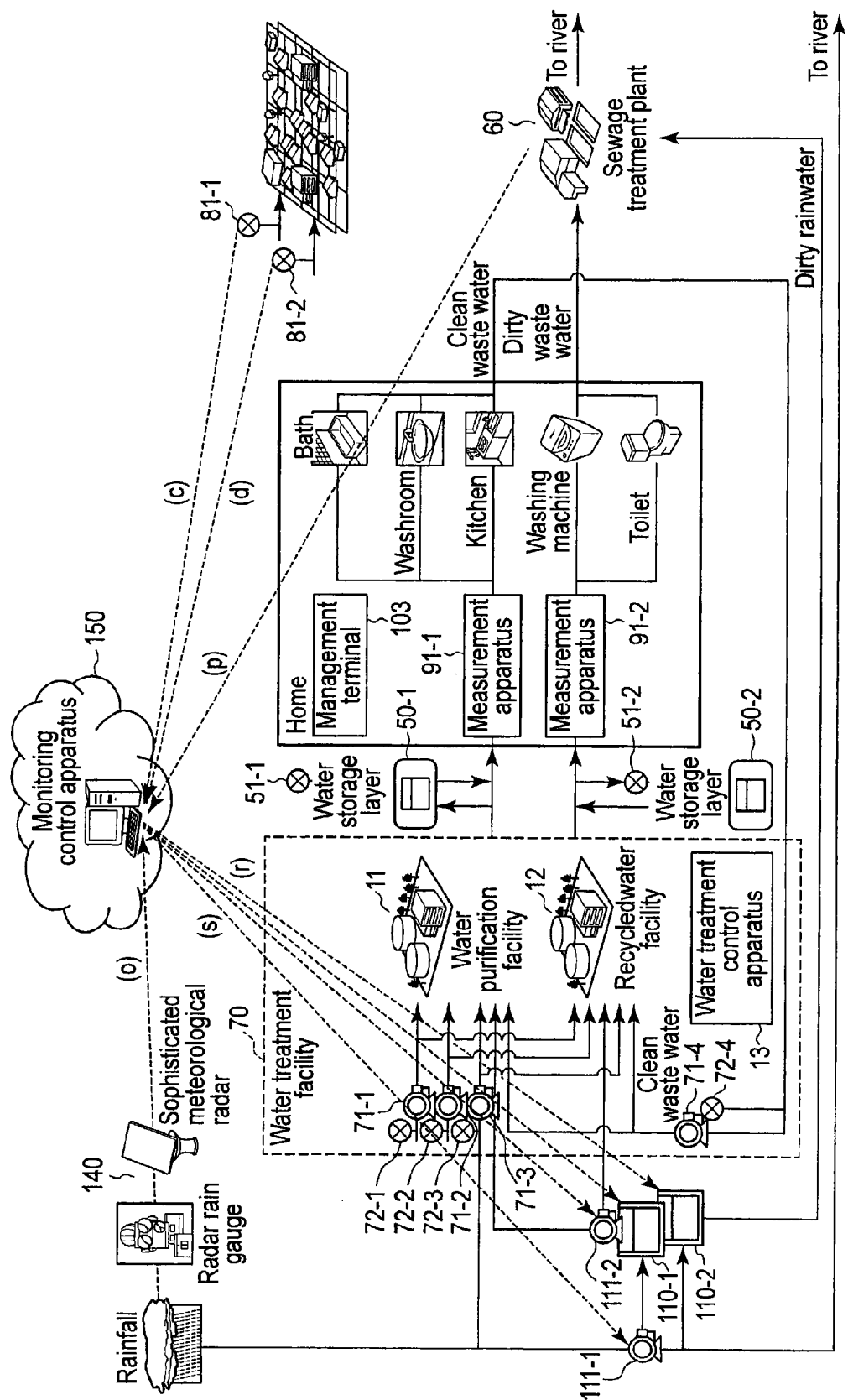
F I G. 23

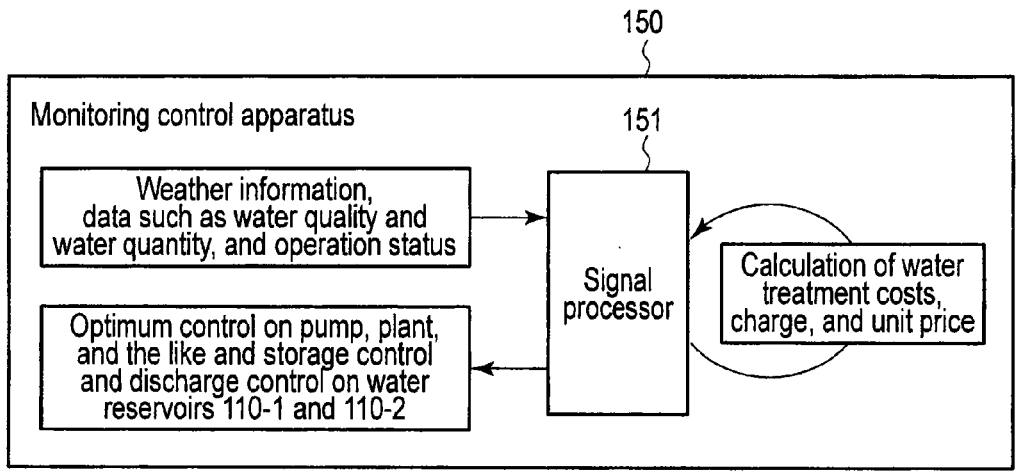
F I G. 24
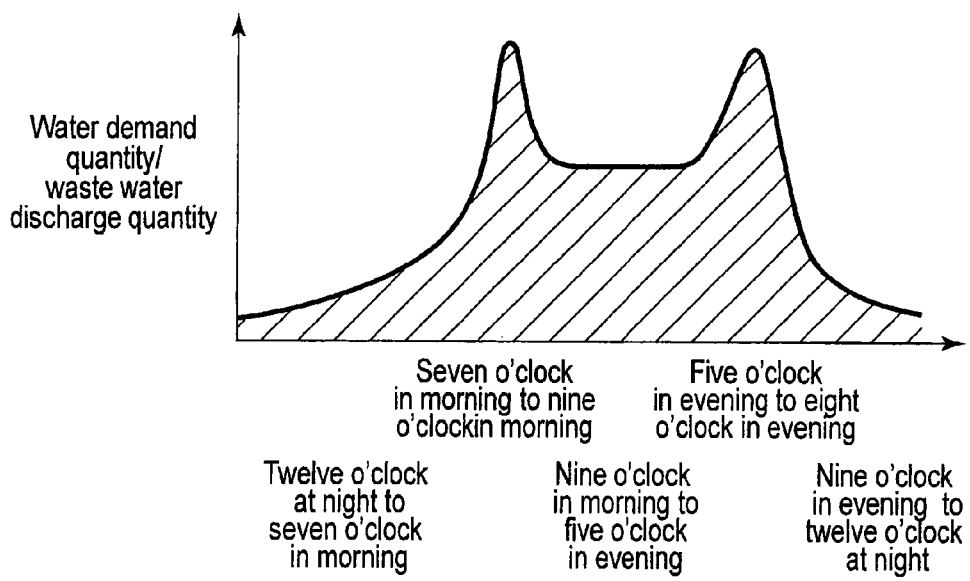
F I G. 25

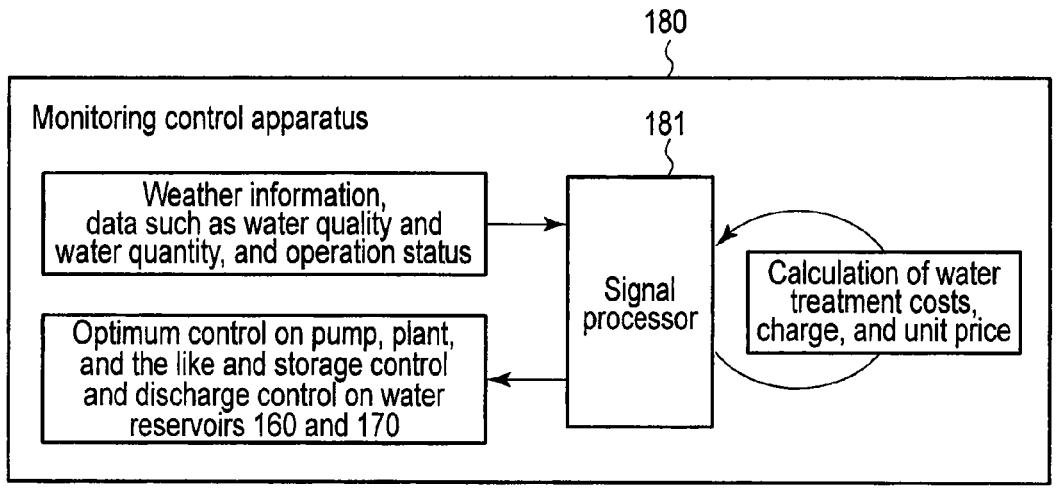
F I G. 27
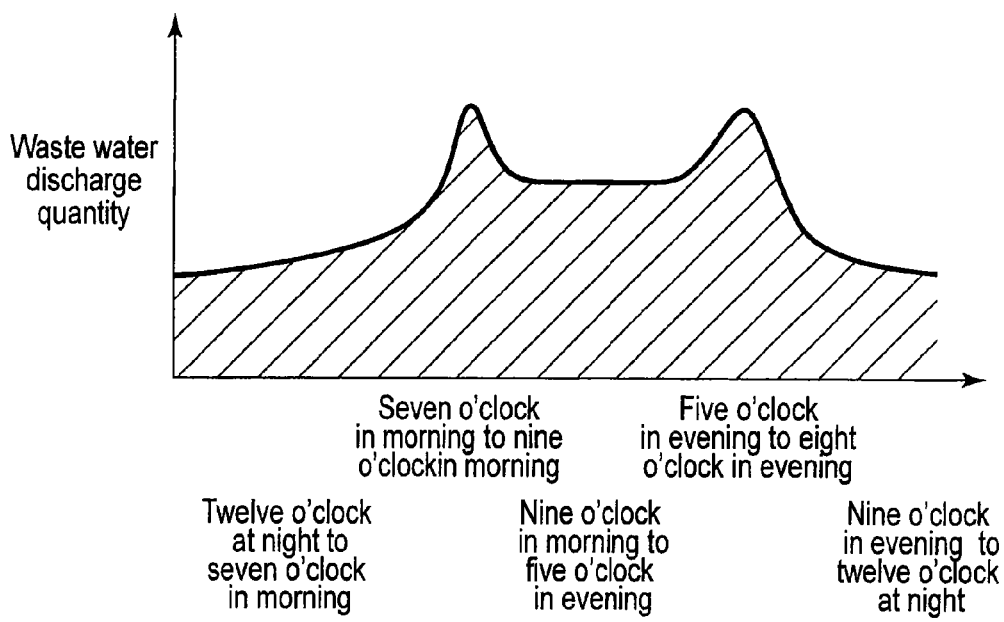
F I G. 28

WATER TREATMENT CONTROL APPARATUS AND WATER TREATMENT SYSTEM

CROSS-REFERENCE TO RELATED APPLICATIONS

This application is based upon and claims the benefit of priority from prior Japanese Patent Application No. 2013-094510, filed Apr. 26, 2013, the entire contents of which are incorporated herein by reference.

FIELD

Embodiments of the present invention relate to a water treatment control apparatus controlling a water treatment facility and a water treatment system controlling the water treatment facility based on, for example, customers' demands for water.

BACKGROUND

In general, water suppliers take water from water sources such as rivers and treat the taken water in water purification facilities to a drinking water level. The water treated to the drinking water level is supplied to customers as tap water. The customers use water, for example, in a bath, a washroom, and a kitchen and for a washing machine and a toilet, and discharge the used water as waste water. The discharged waste water is treated in sewage treatment facilities to a given level of water quality. The treated waste water is then discharged to rivers.

Water sources are finite and may fail to secure a sufficient water supply during drought. Furthermore, tap water used by the customers is discharged as waste water, and all of the waste water is treated in the sewage treatment facilities. This disadvantageously increases sewage treatment costs.

BRIEF DESCRIPTION OF THE DRAWINGS

FIG. 1 is a diagram showing a configuration of a water and sewer system including a water treatment facility according to a first embodiment.

FIG. 2 is a diagram showing a configuration of the water treatment facility shown in FIG. 1.

FIG. 3 is a diagram showing a configuration of a water treatment system according to a second embodiment.

FIG. 4 is a diagram showing a functional configuration of a monitoring control apparatus shown in FIG. 3.

FIG. 5 is a diagram showing a configuration of a water treatment system according to a third embodiment.

FIG. 11 is a diagram showing a configuration of a water treatment system according to a fifth embodiment.

FIG. 12 is a diagram showing a functional configuration of a monitoring control apparatus shown in FIG. 11.

FIG. 19 is a diagram showing a configuration of the water and sewer system including the water treatment facility according to the eighth embodiment.

FIG. 20 is a diagram showing a configuration of a water treatment system according to the eighth embodiment.

FIG. 21 is a diagram showing a functional configuration of a monitoring control apparatus shown in FIG. 20.

FIG. 22 is a diagram showing a configuration of a water treatment system according to a ninth embodiment.

FIG. 23 is a diagram showing a configuration of a water treatment system according to a tenth embodiment.

FIG. 24 is a diagram showing a functional configuration of a monitoring control apparatus shown in FIG. 23.

FIG. 25 is a diagram showing tendencies of the quantities of water demand and waste water.

FIG. 27 is a diagram showing a functional configuration of a monitoring control apparatus shown in FIG. 26.

FIG. 28 is a diagram showing that the tendency of the quantity of waste water exhibits a flattened tendency.

DETAILED DESCRIPTION

Figure 6:
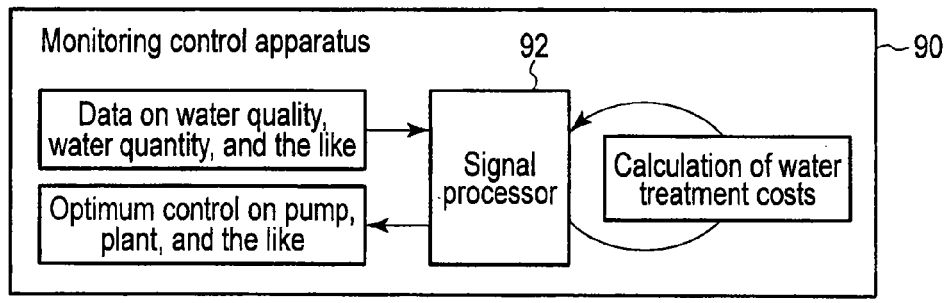
FIG. 6 is a diagram showing a functional configuration of a monitoring control apparatus shown in FIG. 5.

In general, according to one embodiment, a water treatment control apparatus generates an indication to a water treatment facility referring to conditions including a drought status and a water treatment cost at the water treatment facility. The indication indicates a type of water to be taken by the water treatment facility between a plurality of types of water including river water from rivers, rainwater, and waste water used by a customer.

Embodiments will be described below with reference to the drawings.

[First Embodiment]

FIG. 1 is a diagram showing a configuration of a water and sewer system including a water treatment facility 10 according to a first embodiment. The water and sewer system shown in FIG. 1 comprises a water treatment facility 10, distributing reservoirs 20-1 and 20-2, pumps 30-1 and 30-2, distributing towers 40-1 and 40-2, water storage tanks 50-1 and 50-2, and a sewage treatment plant 60.

FIG. 2 is a diagram showing a configuration of the water treatment facility 10 shown in FIG. 1. The water treatment facility 10 shown in FIG. 2 comprises a water purification facility 11, a recycled water facility 12, and a water treatment control apparatus 13.

The water purification facility 11 takes at least one type of water included in river water from rivers, well water, rainwater, and clean waste water discharged by customers, in accordance with an instruction from the water treatment control apparatus 13. The clean waste water will be described below. The water purification facility 11 purifies the taken water to increase the quality of the taken water to a drinking water level, and feeds the purified water to a clean water line. The water fed to the clean water line is hereinafter referred to as clean water.

The recycled water facility 12 takes at least one type of water included in river water from rivers, well water, rainwater, and clean waste water in accordance with an instruction from the water treatment control apparatus 13. The recycled water facility 12 purifies the taken water to a level of water quality at which the water is used by a washing machine and a toilet, and then feeds the purified water to a gray water line. The water fed to the gray water line is hereinafter referred to as gray water. The level of quality of the water purified by the recycled water facility 12 is lower than the level of quality of the water purified by the water purification facility 11. Thus, treatment costs at the recycled water facility 12 can be reduced below treatment costs at the water purification facility 11.

The water treatment control apparatus 13 estimates a shortage status of river water, well water, and rainwater based on the season, the weather, and the like. The water treatment control apparatus 13 then references various conditions, including the estimated shortage status, the quantity of water reserved in the water storage tanks 50-1 and 50-2, and treatment costs at the water purification facility 11 and the recycled water facility 12 for river water, well water, rainwater, and clean waste water to indicate, to the water purification facility 11 and the recycled water facility 12, which type of water is to be taken and treated. For example, high treatment costs are needed to purify clean waste water to a drinking water level in the water purification facility 11. Thus, if the water is not in short supply, clean waste water is taken and treated by the recycled water facility 12 and the gray water is fed to the gray water line.

Clean water fed from the water purification facility 11 to the clean water line is stored in the distributing reservoir 20-1 and then fed to the distributing tower 40-1 by the pump 30-1. The clean water from the distributing tower 40-1 is supplied to a water supply area in which a plurality of customers are present. When a large quantity of clean water is supplied by the distributing tower 40-1, the clean water is reserved in the water storage tank 50-1.

Gray water fed from the recycled water facility 12 to the gray water line is stored in the distributing reservoir 20-2 and then fed to the distributing tower 40-2 by the pump 30-2. The gray water from the distributing tower 40-2 is supplied to the water supply area. When a large quantity of gray water is supplied by the distributing tower 40-2, the gray water is reserved in the water storage tank 50-2.

As shown in FIG. 2, homes present in the water supply area and in which the customers live are each provided with a plurality of facilities such as a bath, a washroom, a kitchen, a washing machine, and a toilet which use water. The plurality of facilities provided in the home use different levels of water quality. For example, water of a drinking-water level of quality is needed for the bath, the washroom, and the kitchen, and such a high water quality is not needed for the washing machine or the toilet. Thus, clean water is supplied to the bath, the washroom, and the kitchen, and gray water is supplied to the washing machine and the toilet.

Furthermore, in the home, used water is classified according to the level of quality of the water. For example, water used in the bath, the washroom, and the kitchen is clean waste water, which is fed to the water treatment facility 10. On the other hand, water used by the washing machine and the toilet is dirty water, which is discharged to the sewage treatment plant 60. The sewage treatment plant 60 treats dirty waste water discharged from the water supply area to a given level of water quality, and then discharges the treated water to rivers and the like. When the water is in seriously short supply, even the water used by the washing machine and the toilet may be fed to the water treatment facility 10 if the water quality is at a level at which the water can be utilized as gray water.

As described above, the water treatment control apparatus 13 according to the first embodiment treats clean waste water discharged by the customer for recycling using the recycled water facility 12. This increases the number of water sources from which water can be taken, enabling water to be supplied to the customer even when there is insufficient water in rivers. Furthermore, the water treatment control apparatus 13 enables a reduction in treatment loads on the water purification facility 11 and the sewage treatment plant 60 compared to the conventional technique. This enables a reduction in the scales of the water purification facility 11 and the sewage treatment plant 60 compared to the conventional technique, allowing a reduction in facility costs and operation costs of the treatment plants. Furthermore, the quantity of water taken from rivers decreases, enabling a reduction in the costs of aquatic rights paid by water suppliers.

Thus, the water treatment control apparatus 13 according to the first embodiment allows a quantity of water to be obtained even during drought and enables a reduction in the sewage treatment costs at the sewage treatment plant.

[Second Embodiment]

FIG. 3 is a diagram showing a configuration of a water treatment system according to a second embodiment. In FIG. 3, (a) denotes water quality data (and water quantity data) transmitted by sensors 72-1 to 72-4, (b) denotes water quantity data transmitted by sensors 51-1 and 51-2, (c) denotes water quantity data on a clean water line transmitted by a sensor 81-1, (d) denotes water quantity data on a gray water line transmitted by a sensor 81-2, (e) denotes pump control performed on water intake pumps 71-1 to 71-4, (f) denotes water treatment control performed on a water treatment facility 70, and (g) denotes water storage control and water discharge control performed on water storage tanks 50-1 and 50-2. The water treatment system shown in FIG. 3 comprises the water treatment facility 70, the water storage tanks 50-1 and 50-2, the water quantity sensors 81-1 and 81-2, and a monitoring control apparatus 80.

The water treatment facility 70 comprises a water purification facility 11, a recycled water facility 12, a water treatment control apparatus 13, the water intake pumps 71-1 to 71-4, and the sensors 72-1 to 72-4.

The sensor 72-1 measures the quality of river water and transmits acquired water quality data to the monitoring control apparatus 80. Under the control of the monitoring control apparatus 80, the water intake pump 71-1 takes river water and feeds the taken river water to the water purification facility 11 and/or the recycled water facility 12.

The sensor 72-2 measures the quality and quantity of well water, and transmits the acquired water quality data and water quantity data to the monitoring control apparatus 80. Under the control of the monitoring control apparatus 80, the water intake pump 71-2 takes well water and feeds the taken water to the water purification facility 11 and/or the recycled water facility 12.

The sensor 72-3 measures the quality of rainwater and transmits the acquired water quality data to the monitoring control apparatus 80. Under the control of the monitoring control apparatus 80, the water intake pump 71-3 takes well water and feeds the taken well water to the water purification facility 11 and/or the recycled water facility 12.

The sensor 72-4 measures the water quality and water quantity of clean waste water and transmits the acquired water quality data and water quantity data to the monitoring control apparatus 80. Under the control of the monitoring control apparatus 80, the water intake pump 71-4 takes clean waste water and feeds the taken rainwater to the water purification facility 11 and/or the recycled water facility 12.

The water storage tank 50-1 comprises the sensor 51-1. The sensor 51-1 measures the quantity of water in the water storage tank 50-1 and transmits the acquired water quantity data to the monitoring control apparatus 80. Under the water storage control of the monitoring control apparatus 80, the water storage tank 50-1 stores clean water. Furthermore, under the water discharge control of the monitoring control apparatus 80, the water storage tank 50-1 discharges the reserved clean water to the clean water line.

The water storage tank 50-2 comprises the sensor 51-2. The sensor 51-2 measures the quantity of water in the water storage tank 50-2 and transmits the acquired water quantity data to the monitoring control apparatus 80. Under the water storage control of the monitoring control apparatus 80, the water storage tank 50-2 stores gray water. Furthermore, under the water discharge control of the monitoring control apparatus 80, the water storage tank 50-2 discharges the reserved gray water to the gray water line.

The sensor 81-1 is provided on the clean water line to measure the quantity of clean water supplied to a water supply area. The sensor 81-1 transmits the acquired water quantity data to the monitoring control apparatus 80.

The sensor 81-2 is provided on the gray water line to measure the quantity of clean water supplied to the water supply area. The sensor 81-2 transmits the acquired water quantity data to the monitoring control apparatus 80.

The monitoring control apparatus 80 is, for example, a cloud server comprising a plurality of servers. The monitoring control apparatus 80 is connected to the water treatment facility 70, the sensors 81-1 and 81-2, and the water storage tanks 50-1 and 50-2 by a network such as the Internet. The monitoring control apparatus 80 receives the water quality data and water quantity data transmitted by the sensors 72-1 to 72-4, the water quantity data transmitted by the sensors 51-1 and 51-2, and the water quantity data transmitted by the sensors 81-1 and 81-2.

As shown in FIG. 4, the monitoring control apparatus 80 comprises a signal processor 82. The signal processor 82 includes, for example, a CPU (Central Processing Unit) and storage areas for programs and data needed for the CPU to carry out processing, such as a ROM (Read Only Memory) and RAM (Random Access Memory). Based on the water quantity data transmitted by the sensors 81-1 and 81-2, the signal processor 82 generates first water demand data indicative of a demand for clean water in the water supply area and second water demand data indicative of a demand for gray water in the water supply area. The signal processor 82 references the quantity of water in the water storage tanks 50-1 and 50-2 determined based on the sensors 51-1 and 51-2 and the qualities and quantities of water sources determined based on the sensors 72-1 to 72-4 to determine the quantities of river water, well water, rainwater, and clean waste water to be treated in the water purification facility 11 and the recycled water facility 12 so as to minimize water treatment costs at the water purification facility 11 and the recycled water facility 12, while meeting the water demands indicated by the first and second water demand data. The signal processor 82 controls the water intake pumps 71-1 to 71-4, the water treatment control apparatus 13, and the water storage tanks 50-1 and 50-2 so as to realize the determined quantities of water to be treated.

The quantity and quality of water sources such as river water, well water, and rainwater constantly vary. For example, a large quantity of rainwater can be secured in a rainy season but securing rainwater is difficult in a dry season. Furthermore, the rainwater is severely contaminated with dirt and dust immediately after rainfall but is decontaminated by the time a given time elapses. Water treatment of less contaminated water involves lower water treatment costs than water treatment for much more contaminated water. Thus, determining the quantity of water to be treated based on the quantity and quality of the water sources is effective.

The control for reducing the water treatment costs at the water purification facility 11 may be, for example, control for reducing the quantity of air from a blower in an aerobic bath provided in the water purification facility 11 when the water quality is higher than a predetermined level.

As described above, the water treatment control apparatus 13 according to the second embodiment uses the recycled water facility 12 to treat clean waste water discharged by customers so as to make the waste water recyclable. This increases the number of water sources from which water can be taken, enabling water to be supplied to the customers even when, for example, there is insufficient water in rivers. Furthermore, the water treatment control apparatus 13 enables a reduction in treatment loads on the water purification facility 11 and the sewage treatment plant 60 compared to the conventional technique. This enables a reduction in the scales of the water purification facility 11 and the sewage treatment plant 60 compared to the conventional technique, allowing a reduction in facility costs and in the operation costs of the treatment plants.

Thus, the water treatment system according to the second embodiment can secure a quantity of water during drought and reduce sewage treatment costs at the sewage treatment plant.

Furthermore, the water treatment system according to the second embodiment controls the water treatment facility 70 based on the water quality data and water quantity data on the water sources acquired by the sensors 72-1 to 72-4, the water quantity data on the water storage tanks 50-1 and 50-2 acquired by the sensors 51-1 and 51-2, and the water quantity data on the water supply area acquired by the sensors 81-1 and 81-2. This enables a more effective reduction in the treatment costs at the water purification facility 11 and the recycled water facility 12.

[Third Embodiment]

FIG. 5 is a diagram showing a configuration of a water treatment facility 10 according to a third embodiment. In FIG. 5, (a) denotes water quality data (and water quantity data) transmitted by sensors 72-1 to 72-4, (b) denotes water quantity data transmitted by sensors 51-1 and 51-2, (c) denotes water quantity data on a clean water line transmitted by a sensor 81-1, (d) denotes water quantity data on a gray water line transmitted by a sensor 81-2, (e) denotes pump control performed on water intake pumps 71-1 to 71-4, (f) denotes water treatment control performed on a water treatment facility 70, (g) denotes water storage control and water discharge control performed on water storage tanks 50-1 and 50-2, (h) denotes data on the quantity of clean water used which is uploaded by a measurement apparatus 91-1, and (i) denotes data on the quantity of gray water used which is uploaded by a measurement apparatus 91-2. The water treatment system shown in FIG. 5 comprises the water treatment facility 70, the water storage tanks 50-1 and 50-2, the water quantity sensors 81-1 and 81-2, the measurement apparatuses 91-1 and 91-2, and a monitoring control apparatus 90.

The measurement apparatus 91-1 is, for example, a smart meter and is installed on the clean water line at each of the homes present in a water supply area. The measurement apparatus 91-1 measures the quantity of clean water used by a customer, which is included in the quantity of water used by the customer. The measurement apparatus 91-1 uploads the measured quantity of used clean water to the monitoring control apparatus 90 in real time as used quantity data.

The measurement apparatus 91-2 is, for example, a smart meter and is installed on the gray water line at each of the homes present in the water supply area. The measurement apparatus 91-2 measures the quantity of gray water used by the customer, which is included in the quantity of water used by the customer. The measurement apparatus 91-2 uploads the measured quantity of used gray water to the monitoring control apparatus 90 in real time as used quantity data.

The monitoring control apparatus 90 is, for example, a cloud server comprising a plurality of servers. The monitoring control apparatus 90 is connected to the water treatment facility 70, the sensors 81-1 and 81-2, the water storage tanks 50-1 and 50-2, and the home by a network such as the Internet. The monitoring control apparatus 90 receives the water quality data and water quantity data transmitted by the sensors 72-1 to 72-4, the water quantity data transmitted by the sensors 51-1 and 51-2, the water quantity data transmitted by the sensors 81-1 and 81-2, and the used quantity data transmitted by the measurement apparatuses 91-1 and 91-2.

As shown in FIG. 6, the monitoring control apparatus 90 comprises a signal processor 92. The signal processor 92 includes, for example, a CPU and storage areas for programs and data needed for the CPU to carry out processing, such as a ROM and RAM. The signal processor 92 generates first water demand data indicative of a demand for clean water in the water supply area based on the used quantity data transmitted by the measurement apparatus 91-1 installed at each home. The signal processor 92 also generates second water demand data indicative of a demand for gray water in the water supply area based on the used quantity data transmitted by the measurement apparatus 91-2 installed at each home. Additionally, when the first water demand data and the second water demand data are generated, interpolation can be carried out using the water quantity data transmitted by the sensor 81-1 and the water quantity data transmitted by the sensor 81-2. If the used quantity data cannot be obtained from the measurement apparatuses at all the customers because, for example, some measurement apparatuses have not been in an appropriate condition or are defective, the water quantity data transmitted by the sensors is indicative of a larger value. In this case, water demand data is generated using the used quantity data from the measurement apparatuses and the water quantity data from the sensors. For example, water demand data can be generated with reference to relations between past used quantity data and water quantity data.

The signal processor 92 references the quantity of water in the water storage tanks 50-1 and 50-2 determined based on the sensors 51-1 and 51-2 and the qualities and quantities of water sources determined based on the sensors 72-1 to 72-4 to determine the quantities of river water, well water, rainwater, and clean waste water to be treated in a water purification facility 11 and a recycled water facility 12 so as to minimize water treatment costs at the water purification facility 11 and the recycled water facility 12, while meeting the water demands indicated by the first and second water demand data. The signal processor 92 controls the water intake pumps 71-1 to 71-4, a water treatment control apparatus 13, and the water storage tanks 50-1 and 50-2 so as to realize the determined quantities of water to be treated.

As described above, the water treatment control apparatus 13 according to the third embodiment uses the recycled water facility 12 to treat clean waste water discharged by the customer so as to make the waste water recyclable. This increases the number of water sources from which water can be taken, enabling water to be supplied to the customer even when, for example, there is insufficient water in rivers. Furthermore, the water treatment control apparatus 13 enables a reduction in treatment loads on the water purification facility 11 and the sewage treatment plant 60 compared to the conventional technique. This enables a reduction in the scales of the water purification facility 11 and the sewage treatment plant 60 compared to the conventional technique, allowing a reduction in facility costs and in the operation costs of the treatment plants.

Thus, the water treatment system according to the third embodiment can secure a quantity of water during drought and reduce sewage treatment costs at the sewage treatment plant.

Furthermore, the water treatment system according to the third embodiment controls the water treatment facility 70 based on the water quality data and water quantity data on the water sources acquired by the sensors 72-1 to 72-4, the water quantity data on the water storage tanks 50-1 and 50-2 acquired by the sensors 51-1 and 51-2, and the used quantity data for each home acquired by the measurement apparatuses 91-1 and 91-2. Consequently, the monitoring control apparatus 90 can determine the quantity of water demand for each water quality for each home in real time and thus optimally operate the water treatment facility 10 and the water storage tanks 50-1 and 50-2 in keeping with the momentarily varying demand for water in the water supply area.

[Fourth Embodiment]

Figure 7:
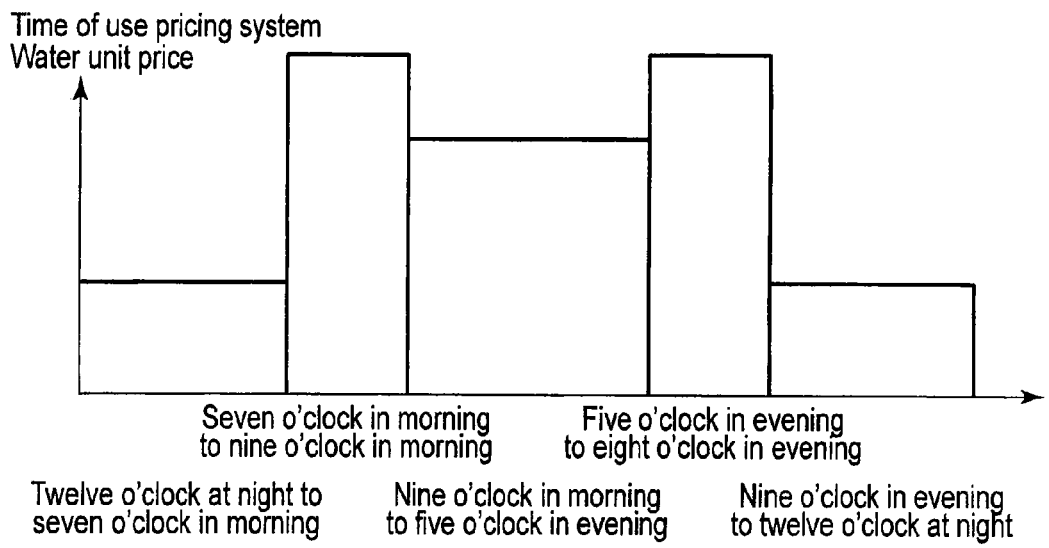
FIG. 7 is a diagram showing changes in the unit price of water resulting from adoption of a time of use pricing system.
Figure 8:
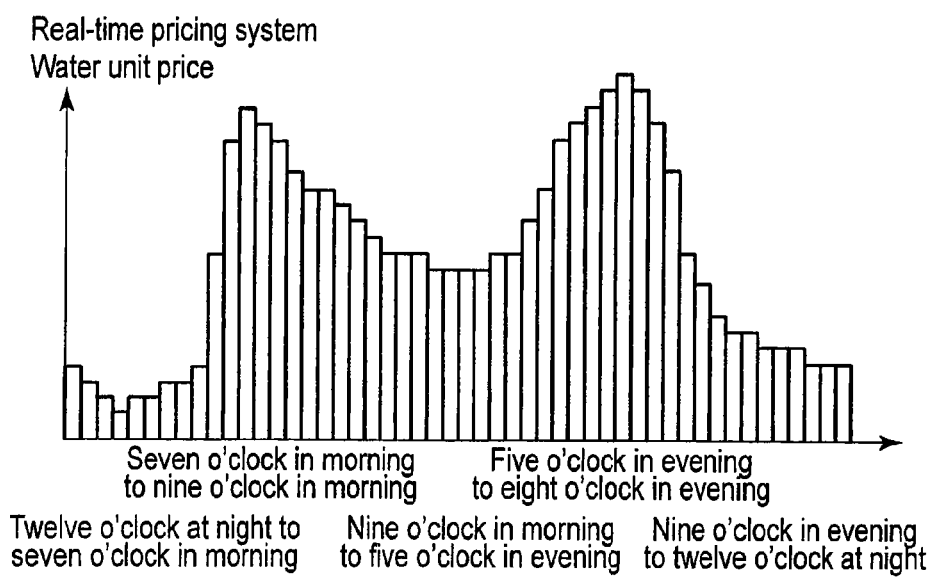
FIG. 8 is a diagram showing changes in the unit price of water resulting from adoption of a real-time pricing system.

The first to third embodiments have been described taking, as an example, the case where a general water rate system is adopted which is based on the basic usage of water and in which the water charge depends on a metered rate. However, the costs of supplied water vary depending on the water source due to the cost of the aquatic right, the cost of water treatment (the cost varies depending on the water quality), and the like. Furthermore, during drought, the water supplier is willing to reduce the quantity of water taken from rivers as much as possible in order to stably supply water. Thus, in a fourth embodiment to an eleventh embodiment, a case will be described where a system is adopted which reflects a difference in water supply costs and an intentional operating policy into the water unit price for customers, for example, a time of use pricing system or a real-time pricing system. The time of use pricing system is a rate system that varies the water unit price depending on a time of day and a period (season or the like) based on past trends and the like. Changes in water unit price are, for example, as shown in FIG. 7. The real-time pricing system is a rate system that changes a pricing schedule according to the actual situation. Changes in water unit price are, for example, as shown in FIG. 8.

Figure 9:
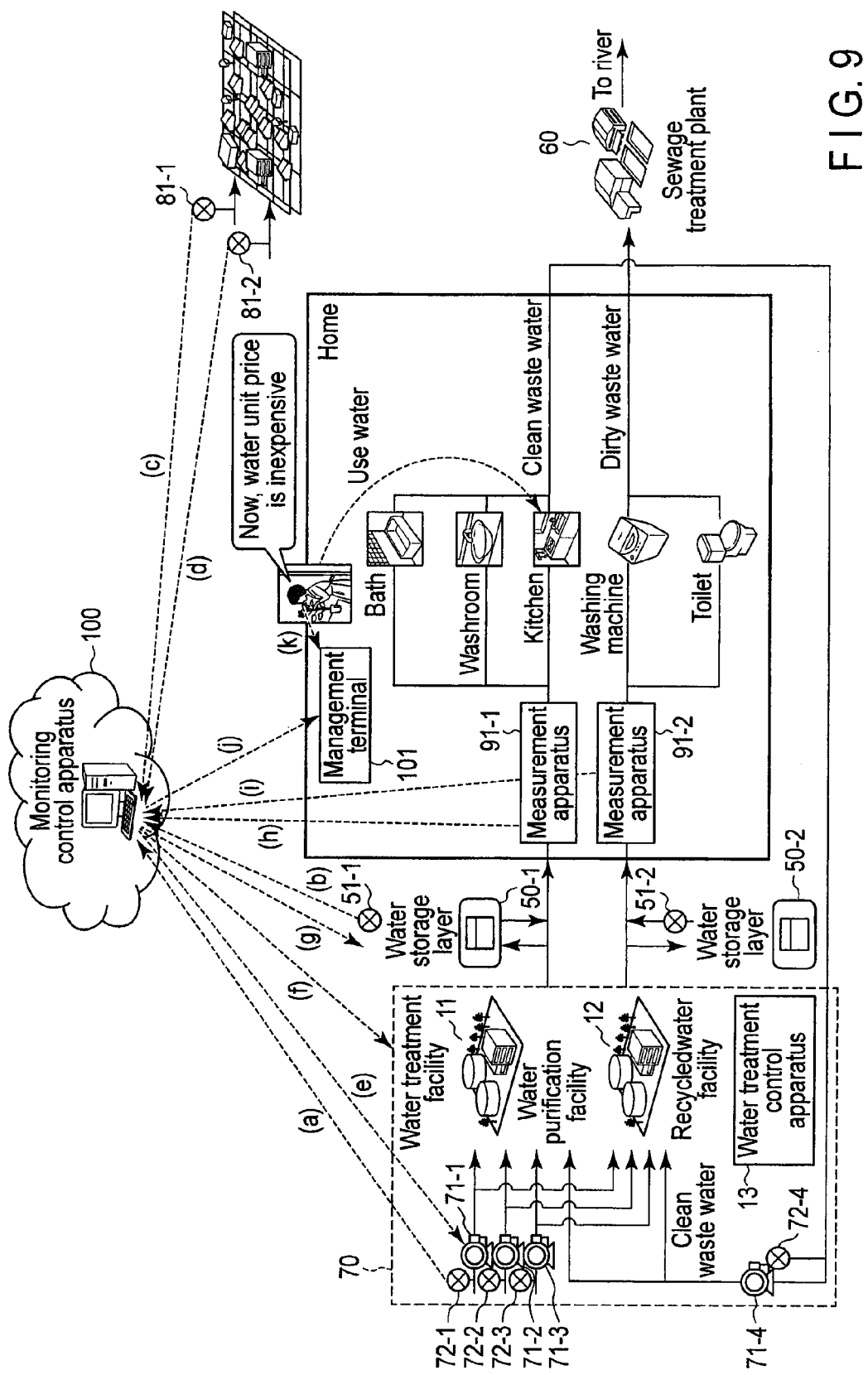
FIG. 9 is a diagram showing a configuration of a water treatment system according to a fourth embodiment.

FIG. 9 is a diagram showing a configuration of a water treatment system according to the fourth embodiment. In FIG. 9, (a) denotes water quality data (and water quantity data) transmitted by sensors 72-1 to 72-4, (b) denotes water quantity data transmitted by sensors 51-1 and 51-2, (c)

denotes water quantity data on a clean water line transmitted by a sensor 81-1, (d) denotes water quantity data on a gray water line transmitted by a sensor 81-2, (e) denotes pump control performed on water intake pumps 71-1 to 71-4, (f) denotes water treatment control performed on a water treatment facility 70, (g) denotes water storage control and water discharge control performed on water storage tanks 50-1 and 50-2, (h) denotes data on the quantity of clean water used which is uploaded by a measurement apparatus 91-1, (i) denotes data on the quantity of gray water used which is uploaded by a measurement apparatus 91-2, and (j) denotes first and second water unit price information provided to a management terminal 101. The water treatment system shown in FIG. 9 comprises the water treatment facility 70, the water storage tanks 50-1 and 50-2, the water quantity sensors 81-1 and 81-2, the measurement apparatuses 91-1 and 91-2, the management terminal 101, and a monitoring control apparatus 100.

The management terminal 101 is, for example, a home energy management system (HEMS) with a display section and is installed at each home present in a water supply area. The management terminal 101 displays the first and second water unit price information provided by the monitoring control apparatus 100. The first water unit price information represents the water unit price of clean water. The second water unit price information represents the water unit price of gray water. A customer references the first and second water unit price information displayed on the management terminal 101 to use facilities provided in the customer's home. For example, upon determining that the water unit price of clean water is expensive at the current time of day, the customer refrains from using the bath, the washroom, and the kitchen. Upon determining that the water unit price of clean water is inexpensive at the current time of day, the customer uses these facilities.

The monitoring control apparatus 100 is, for example, a cloud server comprising a plurality of servers. The monitoring control apparatus 100 is connected to the water treatment facility 70, the sensors 81-1 and 81-2, the water storage tanks 50-1 and 50-2, and the home by a network such as the Internet. The monitoring control apparatus 100 receives the water quality data and water quantity data transmitted by the sensors 72-1 to 72-4, the water quantity data transmitted by the sensors 51-1 and 51-2, the water quantity data transmitted by the sensors 81-1 and 81-2, and the used quantity data transmitted by the measurement apparatuses 91-1 and 91-2.

Figure 10:
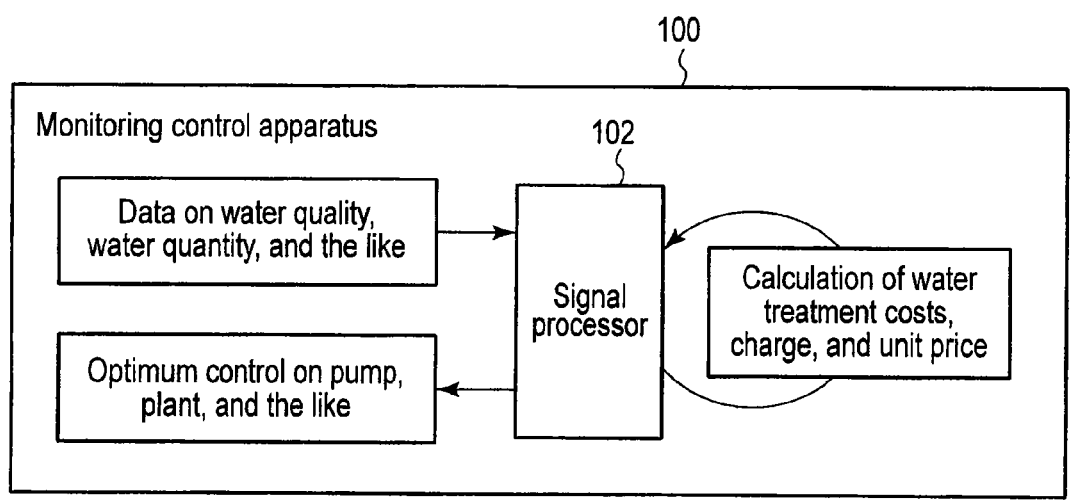
FIG. 10 is a diagram showing a functional configuration of a monitoring control apparatus shown in FIG. 9.

As shown in FIG. 10, the monitoring control apparatus 100 comprises a signal processor 102. The signal processor 102 includes, for example, a CPU and storage areas for programs and data needed for the CPU to carry out processing, such as a ROM and RAM. The signal processor 102 generates first water demand data indicative of a demand for clean water in the water supply area based on the used quantity data transmitted by the measurement apparatus 91-1 installed at each home. The signal processor 102 also generates second water demand data indicative of a demand for gray water in the water supply area based on the used quantity data transmitted by the measurement apparatus 91-2 installed at each home.

When the time of use pricing system is adopted, the signal processor 102 generates first water unit price information from the water unit price of clean water set based on past trends and the like, and transmits the generated first water unit price information to the management terminal 101 installed at each home. The signal processor 102 also generates second water unit price information from the water unit price of gray water set based on past trends and the like, and transmits the generated second water unit price information to the management terminal 101. Furthermore, when the real-time pricing system is adopted, the signal processor 102 generates first water unit price information based on first water demand data, and transmits the generated first water unit price information to the management terminal 101. The signal processor 102 also generates second water unit price information based on second water demand data, and transmits the generated second water unit price information to the management terminal 101.

The signal processor 102 references the quantity of water in the water storage tanks 50-1 and 50-2 determined based on the sensors 51-1 and 51-2 and the qualities and quantities of water sources determined based on the sensors 72-1 to 72-4 to determine the quantities of river water, well water, rainwater, and clean waste water to be treated in a water purification facility 11 and a recycled water facility 12 so as to minimize water treatment costs at the water purification facility 11 and the recycled water facility 12, while meeting the water demands indicated by the first and second water demand data. The signal processor 102 controls the water intake pumps 71-1 to 71-4, a water treatment control apparatus 13, and the water storage tanks 50-1 and 50-2 so as to realize the determined quantities of water to be treated.

As described above, the water treatment control apparatus 13 according to the fourth embodiment uses the recycled water facility 12 to treat clean waste water discharged by customers so as to make the waste water recyclable. This increases the number of water sources from which water can be taken, enabling water to be supplied to the customers even when, for example, there is insufficient water in rivers. Furthermore, the water treatment control apparatus 13 enables a reduction in treatment loads on the water purification facility 11 and the sewage treatment plant 60 compared to the conventional technique. This enables a reduction in the scales of the water purification facility 11 and the sewage treatment plant 60 compared to the conventional technique, allowing a reduction in facility costs and in the operation costs of the treatment plants.

Thus, the water treatment system according to the fourth embodiment can secure a quantity of water during drought and reduce sewage treatment costs at the sewage treatment plant.

Furthermore, the water treatment system according to the fourth embodiment transmits the first water unit price information on clean water and the second water unit price information on gray water to the management terminal 101 installed at each home. The management terminal 101 then displays the first and second water unit price information. Thus, the customer can appropriately determine, for each purpose, whether water can be utilized based on the charge according to the water quality. This enables a reduction in water rate and contributes to smoothing of the used quantity of water and peak shifting.

[Fifth Embodiment]

FIG. 11 is a diagram showing a configuration of a water treatment system according to a fifth embodiment. In FIG. 11, (a) denotes water quality data (and water quantity data) transmitted by sensors 72-1 to 72-4, (b) denotes water quantity data transmitted by sensors 51-1 and 51-2, (c) denotes water quantity data on a clean water line transmitted by a sensor 81-1, (d) denotes water quantity data on a gray water line transmitted by a sensor 81-2, (e) denotes pump control performed on water intake pumps 71-1 to 71-4, (f) denotes water treatment control performed on a water treatment facility 70, (g) denotes water storage control and water discharge control performed on water storage tanks 50-1 and 50-2, (h) denotes data on the quantity of clean water used which is uploaded by a measurement apparatus 91-1, (i) denotes data on the quantity of gray water used which is uploaded by a measurement apparatus 91-2, (j) denotes first and second water unit price information provided to a management terminal 101, (k) denotes operating condition settings input by a customer, and (l) denotes on/off operation control performed on facilities in each home. The water treatment system shown in FIG. 11 comprises the water treatment facility 70, the water storage tanks 50-1 and 50-2, the water quantity sensors 81-1 and 81-2, the measurement apparatuses 91-1 and 91-2, a management terminal 103, and a monitoring control apparatus 100.

The management terminal 103 is, for example, a home energy management system and is installed at each home present in a water supply area. The management terminal 103 is provided, by the monitoring control apparatus 100, with first water unit price information on clean water and second water unit price information on gray water. Furthermore, the customer inputs, to the management terminal 103, schedule settings for facilities installed in the home, for example, a bath, a kitchen, and a washing machine. The input schedule settings include, for example, completing filling the bathtub with hot water by oo o'clock in the evening, completing washing dishes by ΔΔ o'clock in the evening, and completing washing by ** o'clock in the morning.

As shown in FIG. 12, the management terminal 103 comprises a signal processor 1031. The signal processor 1031 includes, for example, a CPU and storage areas for programs and data needed for the CPU to carry out processing, such as a ROM and RAM. The signal processor 1031 calculates the optimum times of day at which the respective facilities are operated based on the first and second water unit price information transmitted by the monitoring control apparatus 100 and the schedule settings input by the customer. The signal processor 1031 performs on/off control on the facilities in the home so that the facilities are operated at the respective calculated times of day.

As described above, a water treatment control apparatus 13 according to the fifth embodiment uses a recycled water facility 12 to treat clean waste water discharged by customers so as to make the waste water recyclable. This increases the number of water sources from which water can be taken, enabling water to be supplied to the customers even when, for example, there is insufficient water in rivers. Furthermore, the water treatment control apparatus 13 enables a reduction in treatment loads on a water purification facility 11 and a sewage treatment plant 60 compared to the conventional technique. This enables a reduction in the scales of the water purification facility and the sewage treatment plant 60 compared to the conventional technique, allowing a reduction in facility costs and in the operation costs of the treatment plants.

Thus, the water treatment system according to the fifth embodiment can secure a quantity of water during drought and reduce sewage treatment costs at the sewage treatment plant.

Furthermore, the water treatment system according to the fifth embodiment transmits first water unit price information on clean water and second water unit price information on gray water to the management terminal 103 installed at each home. The management terminal 103 then controls the operation of the facilities provided in the home based on the first and second water unit price information and the schedule settings input by the customer. The bath, the washing machine, and the like vary widely in the time of day when the facility uses water. For example, the bath may be prepared by a certain predetermined time, and washing may be completed by a certain time. Thus, by allowing the management terminal 103 controlling the operation of the facilities at the optimum times of day, the customer can reduce the water rate and contribute to smoothing of the used quantity of water and peak shifting.

[Sixth Embodiment]

Figure 13:
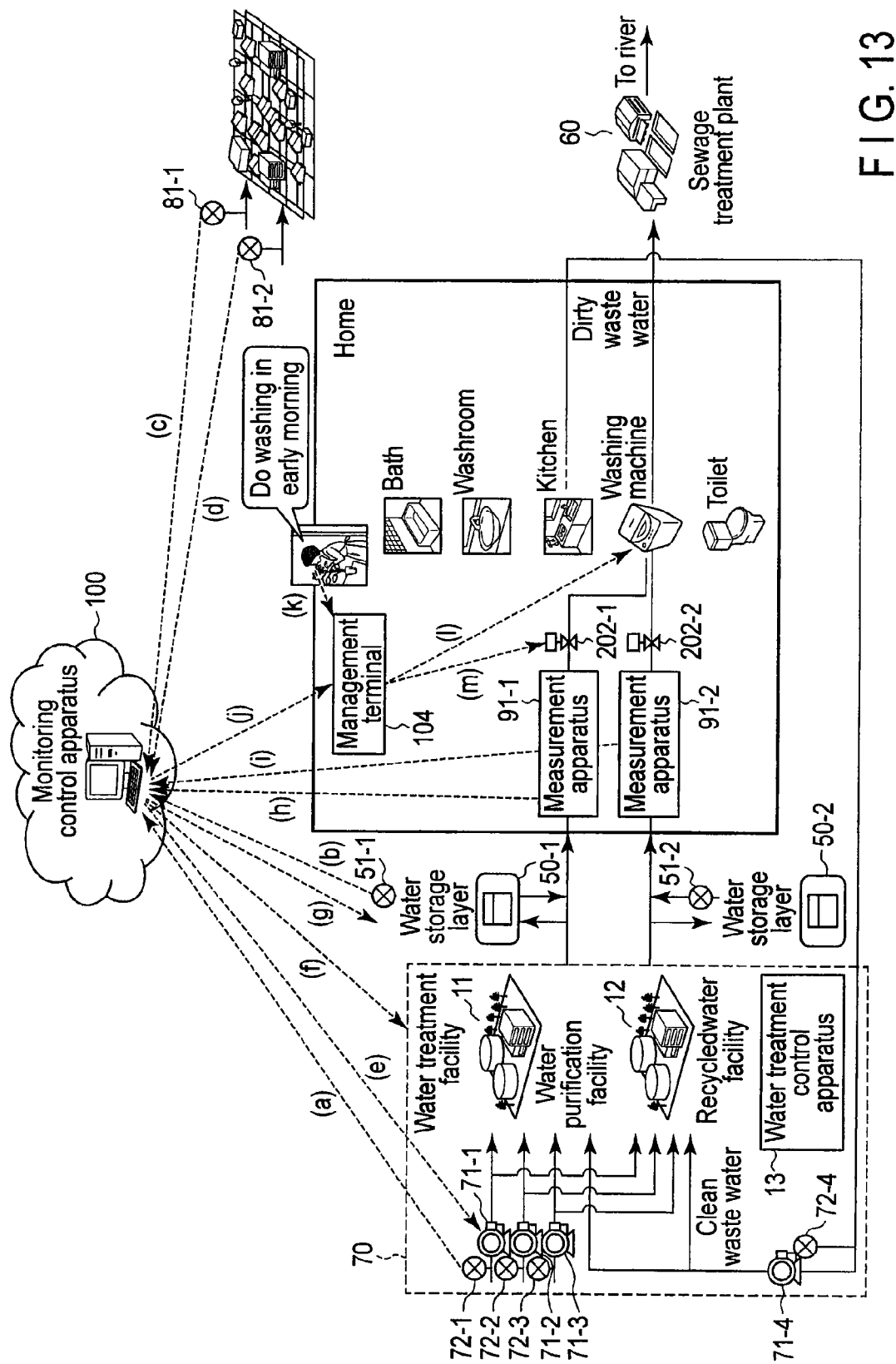
FIG. 13 is a diagram showing a configuration of a water treatment system according to a sixth embodiment.

FIG. 13 is a diagram showing a configuration of a water treatment system according to a sixth embodiment. In FIG. 13, (a) denotes water quality data (and water quantity data) transmitted by sensors 72-1 to 72-4, (b) denotes water quantity data transmitted by sensors 51-1 and 51-2, (c) denotes water quantity data on a clean water line transmitted by a sensor 81-1, (d) denotes water quantity data on a gray water line transmitted by a sensor 81-2, (e) denotes pump control performed on water intake pumps 71-1 to 71-4, (f) denotes water treatment control performed on a water treatment facility 70, (g) denotes water storage control and water discharge control performed on water storage tanks 50-1 and 50-2, (h) denotes data on the quantity of clean water used which is uploaded by a measurement apparatus 91-1, (i) denotes data on the quantity of gray water used which is uploaded by a measurement apparatus 91-2, (j) denotes first and second water unit price information provided to a management terminal 101, (k) denotes operating condition settings input by a customer, (l) denotes on/off operation control performed on facilities in each home, and (m) denotes valve open and close control performed on valves 201-1 and 201-2. The water treatment system shown in FIG. 13 comprises the water treatment facility 70, the water storage tanks 50-1 and 50-2, the water quantity sensors 81-1 and 81-2, the measurement apparatuses 91-1 and 91-2, a management terminal 104, and a monitoring control apparatus 100.

The management terminal 104 is, for example, a home energy management system with a display section and is installed at each home present in a water supply area. The management terminal 104 is provided with first water unit price information and second water unit price information by the monitoring control apparatus 100. The management terminal 104 displays the provided first and second water unit price information.

Each of the facilities in each home comprises a function allowing selective determination of whether to use clean water or gray water. For example, as shown in FIG. 13, when the valve 201-1 is open and the valve 201-2 is closed, clean water is supplied to the washing machine. On the other hand, when the valve 201-1 is closed and the valve 201-2 is open, gray water is supplied to the washing machine. The valves 201-1 and 201-2 are opened and closed under the open and close control of the management terminal 104.

Furthermore, the customer inputs, to the management terminal 104, schedule settings for the facilities installed in the home, for example, a bath, a kitchen, and the washing machine. The input schedule settings include, for example, completing washing by oo o'clock in the morning preferentially using clean water. Additionally, the customer inputs, to the management terminal 104, an instruction to switch from a clean water line to a gray water line or an instruction to switch from the gray water line to the clean water line.

Figure 14:
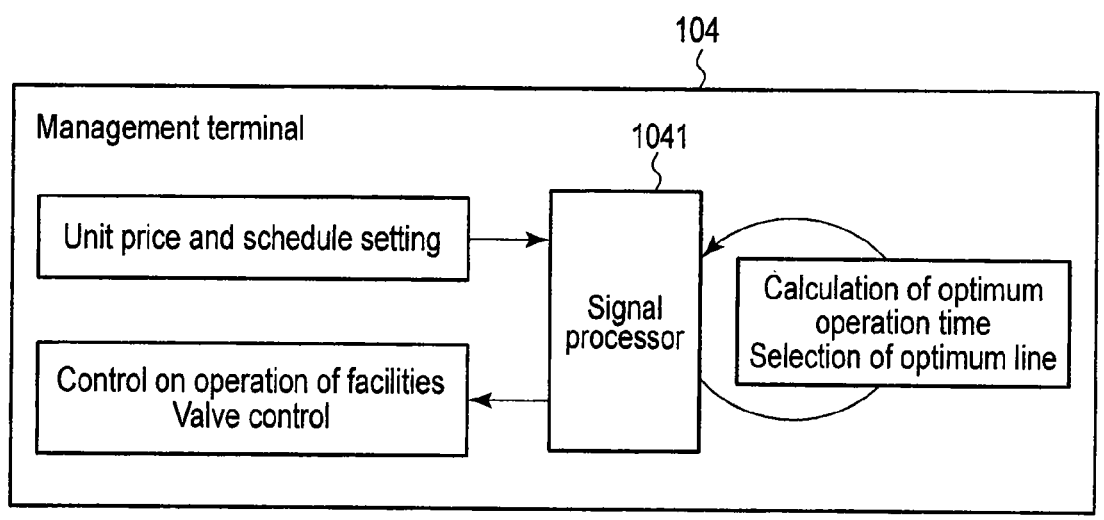
FIG. 14 is a diagram showing a functional configuration of a monitoring control apparatus shown in FIG. 13.

As shown in FIG. 14, the management terminal 104 comprises a signal processor 1041. The signal processor 1041 includes, for example, a CPU and storage areas for programs and data needed for the CPU to carry out processing, such as a ROM and RAM. Based on the first water unit price information on clean water and the second water unit price information on gray water both transmitted by the monitoring control apparatus 100 and schedule settings input by the customer, the signal processor 1041 selects the optimum one of the gray water line and the clean water line and calculates the times of day when the facilities are operated. The signal processor 1041 performs the open and close control on the valves 201-1 and 201-2, and also carries out on/off operation control on the facilities in the home so as to operate the facilities at the respective calculated times of day. For example, the washing machines usually do the washing using gray water. However, if a period of time until a scheduled time contains a time of day such as nighttime hours when the costs of clean water are relatively inexpensive and are not significantly different from the costs of gray water in terms of the water unit price, the management terminal 104, at this time of day, opens the valve 201-1, while closing the valve 201-2 to allow the washing machine to operate using clean water.

Furthermore, when the customer inputs, to the system, an instruction to switch from the clean water line to the gray water line or an instruction to switch from the gray water to the clean water, the signal processor 1041 performs the open and close control on the valves 201-1 and 201-2.

As described above, a water treatment control apparatus 13 according to the sixth embodiment uses a recycled water facility 12 to treat clean waste water discharged by customers so as to make the waste water recyclable. This increases the number of water sources from which water can be taken, enabling water to be supplied to the customers even when, for example, there is insufficient water in rivers. Furthermore, the water treatment control apparatus 13 enables a reduction in treatment loads on a water purification facility 11 and a sewage treatment plant 60 compared to the conventional technique. This enables a reduction in the scales of the water purification facility and the sewage treatment plant 60 compared to the conventional technique, allowing a reduction in facility costs and in the operation costs of the treatment plants.

Thus, the water treatment system according to the sixth embodiment can secure a quantity of water during drought and reduce sewage treatment costs at the sewage treatment plant.

Furthermore, the water treatment system according to the sixth embodiment switches between the water supply lines used by the facilities in each home, by means of the management terminal 104 installed at the home.

Consequently, the customer can switch gray water to clean water for use and thus do the washing or the like using water of a clean water quality. Additionally, the customer can switch clean water to gray water for use and thus further reduce the water rate.

The sixth embodiment has been described taking, as an example, the case where the management terminal 104 switches between the clean water line and the gray water line by performing the open and close control on the valves 201-1 and 201-2. However, the sixth embodiment is not limited to this. For example, each home may be provided with a first faucet for the clean water line and a second faucet for the gray water line. The customer references the first and second water unit price information displayed on the management terminal 104 and uses the facilities utilizing the first or second faucet.

[Seventh Embodiment]

Figure 15:
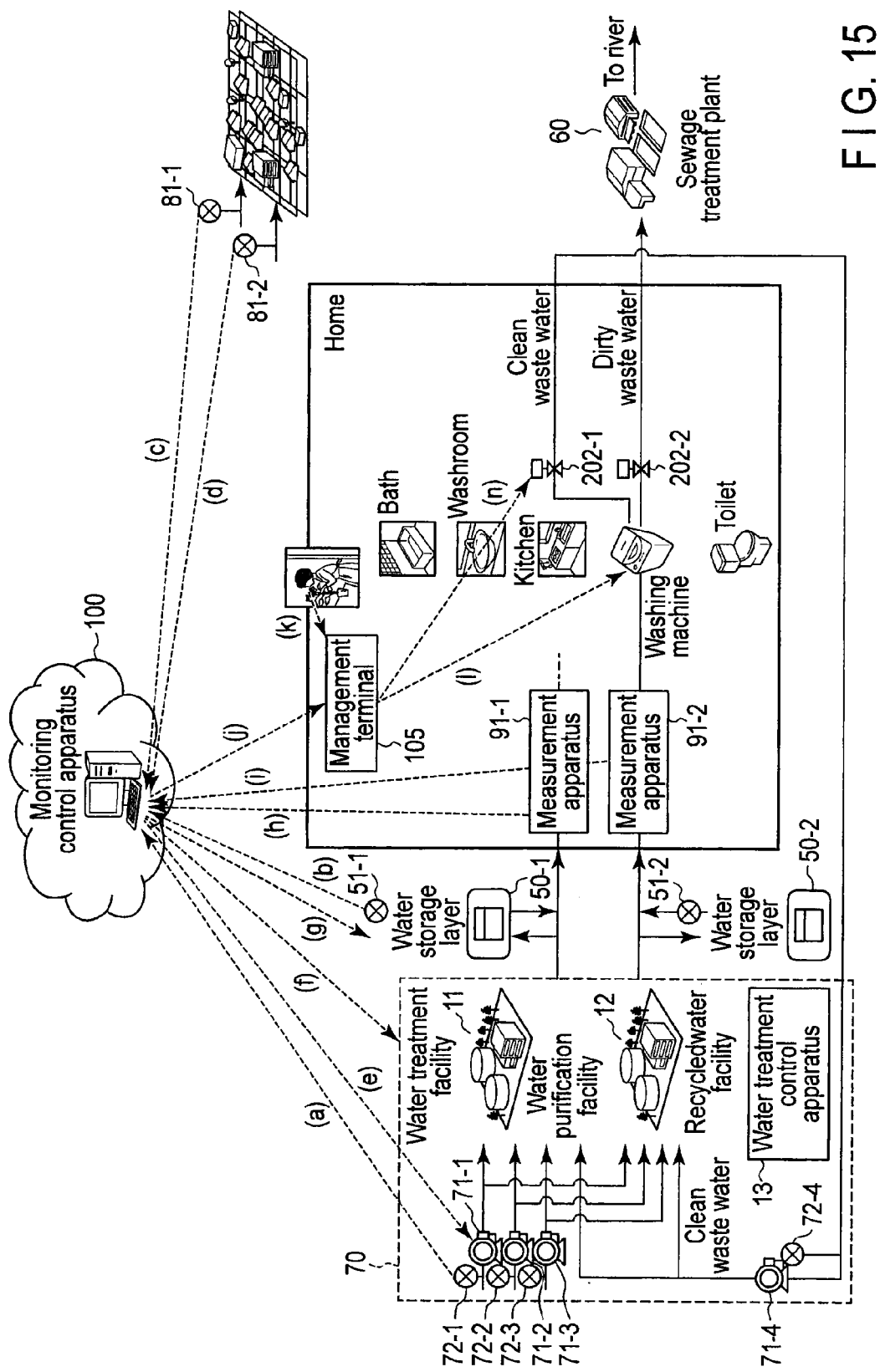
FIG. 15 is a diagram showing a configuration of a water treatment system according to a seventh embodiment.

FIG. 15 is a diagram showing a configuration of a water treatment system according to a seventh embodiment. In FIG. 15, (a) denotes water quality data (and water quantity data) transmitted by sensors 72-1 to 72-4, (b) denotes water quantity data transmitted by sensors 51-1 and 51-2, (c) denotes water quantity data on a clean water line transmitted by a sensor 81-1, (d) denotes water quantity data on a gray water line transmitted by a sensor 81-2, (e) denotes pump control performed on water intake pumps 71-1 to 71-4, (f) denotes water treatment control performed on a water treatment facility 70, (g) denotes water storage control and water discharge control performed on water storage tanks 50-1 and 50-2, (h) denotes data on the quantity of clean water used which is uploaded by a measurement apparatus 91-1, (i) denotes data on the quantity of gray water used which is uploaded by a measurement apparatus 91-2, (j) denotes first and second water unit price information provided to a management terminal 101, (k) denotes operating condition settings input by a customer, (l) denotes on/off operation control performed on facilities in each home, and (n) denotes valve open and close control performed on valves 201-1 and 201-2. The water treatment system shown in FIG. 15 comprises the water treatment facility 70, the water storage tanks 50-1 and 50-2, the water quantity sensors 81-1 and 81-2, the measurement apparatuses 91-1 and 91-2, a management terminal 105, and a monitoring control apparatus 100.

The management terminal 105 is, for example, a home energy management system with a display section and is installed at each home present in a water supply area. The management terminal 105 is provided with first and second water unit price information by the monitoring control apparatus 100. The management terminal 105 displays the provided first and second water unit price information.

Each home comprises a mechanism that enables selection of whether water used by the facilities in the home is discharged as clean waste water or dirty waste water. For example, as shown in FIG. 15, when the valve 202-1 is open and the valve 202-2 is closed, waste water from a washing machine is fed to a water treatment facility as clean waste water. On the other hand, when the valve 202-1 is closed and the valve 202-2 is open, waste water from the washing machine is fed to a sewage treatment facility as dirty waste water. The valves 202-1 and 202-2 are opened and closed under the open and close control of the management terminal 105.

The customer inputs, to the management terminal 105, schedule settings for the facilities installed in the home, for example, a bath, a kitchen, and the washing machine.

Figure 16:
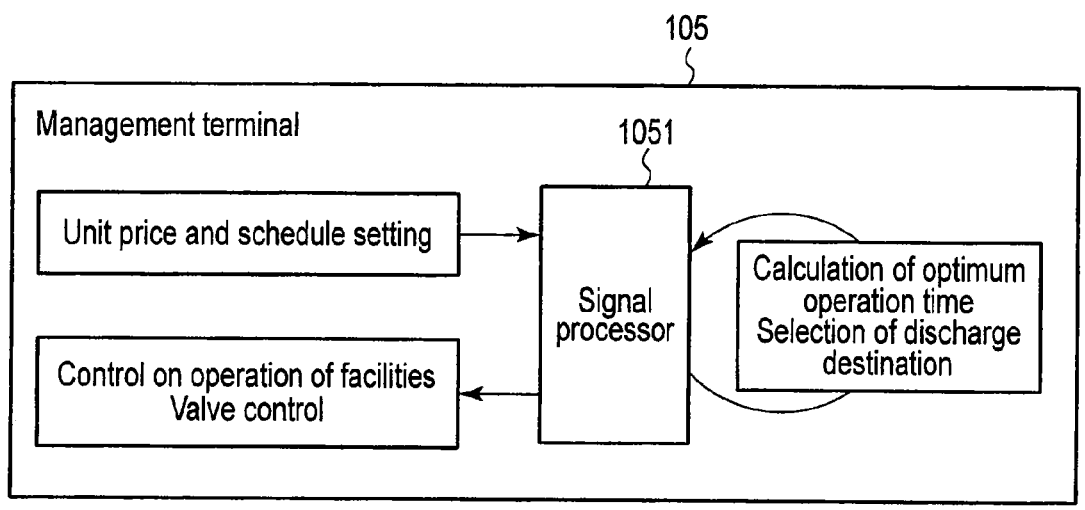
FIG. 16 is a diagram showing a functional configuration of a monitoring control apparatus shown in FIG. 15.

As shown in FIG. 16, the management terminal 105 comprises a signal processor 1051. The signal processor 1051 includes, for example, a CPU and storage areas for programs and data needed for the CPU to carry out processing, such as a ROM and RAM. The signal processor 1051 calculates the optimum times of day at which the respective facilities are operated based on the first water unit price information on clean water and the second water unit price information on gray water both transmitted by the monitoring control apparatus 100 and the schedule settings input by the customer. Furthermore, the water quality of waste water discharged by the facilities in the home is preset in the signal processor 1051. For example, for washing in the washing machine, waste water resulting from a rinsing treatment in an initial stage of the washing has a low water quality. However, waste water resulting from a plurality of rinsing treatments has a high water quality. The signal processor 1051 determines whether the waste water is clean or dirty in accordance with the water quality of the waste water. For example, the signal processor 1051 determines waste water resulting from the first or second rinsing treatment to be dirty waste water, while determining waste water resulting from the third or subsequent rinsing treatment to be clean waste water. Depending on whether the waste water is clean or dirty, the signal processor 1051 performs the open and close control on the valves 202-1 and 202-2.

As described above, a water treatment control apparatus 13 according to the seventh embodiment uses a recycled water facility 12 to treat clean waste water discharged by customers so as to make the waste water recyclable. This increases the number of water sources from which water can be taken, enabling water to be supplied to the customers even when, for example, there is insufficient water in rivers. Furthermore, the water treatment control apparatus 13 enables a reduction in treatment loads on a water purification facility 11 and a sewage treatment plant 60 compared to the conventional technique. This enables a reduction in the scales of the water purification facility and the sewage treatment plant 60 compared to the conventional technique, allowing a reduction in facility costs and in the operation costs of the treatment plants.

Thus, the water treatment system according to the seventh embodiment can secure a quantity of water during drought and reduce sewage treatment costs at the sewage treatment plant.

Furthermore, the water treatment system according to the seventh embodiment switches a destination to which waste water from the facilities in each home is discharged, by means of the management terminal 105 installed at the home. Thus, the water treatment system can select clean waste water or dirty waste water in further detail. Thus, water resources can be efficiently operated.

Figure 17:
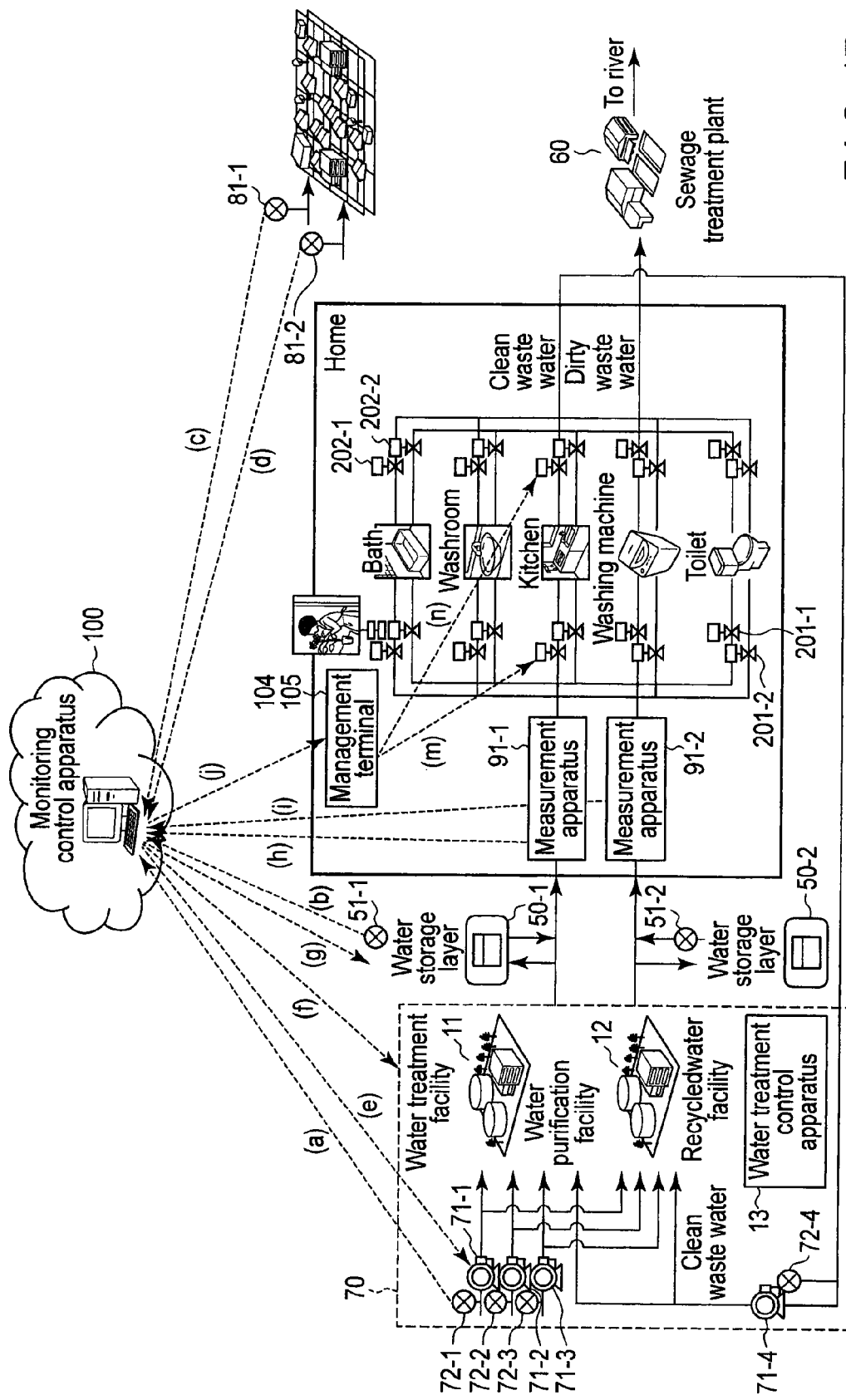
FIG. 17 is a diagram of a configuration of a water treatment system provided when valves shown in FIG. 13 and FIG. 15 are mounted in a facility in each home.

FIG. 17 shows that the valves 201-1 and 201-2 provided in the water treatment system shown in FIG. 13 and the valves 202-1 and 202-2 provided in the water treatment system shown in FIG. 15 are mounted in each of the facilities in the home. Thus, the water treatment systems according to the third to seventh embodiments performs control on a water infrastructure involving the customer, allowing stabilization of water supply and a reduction in the facility costs and operation costs of the water infrastructure.

[Eighth Embodiment]

Figure 18:
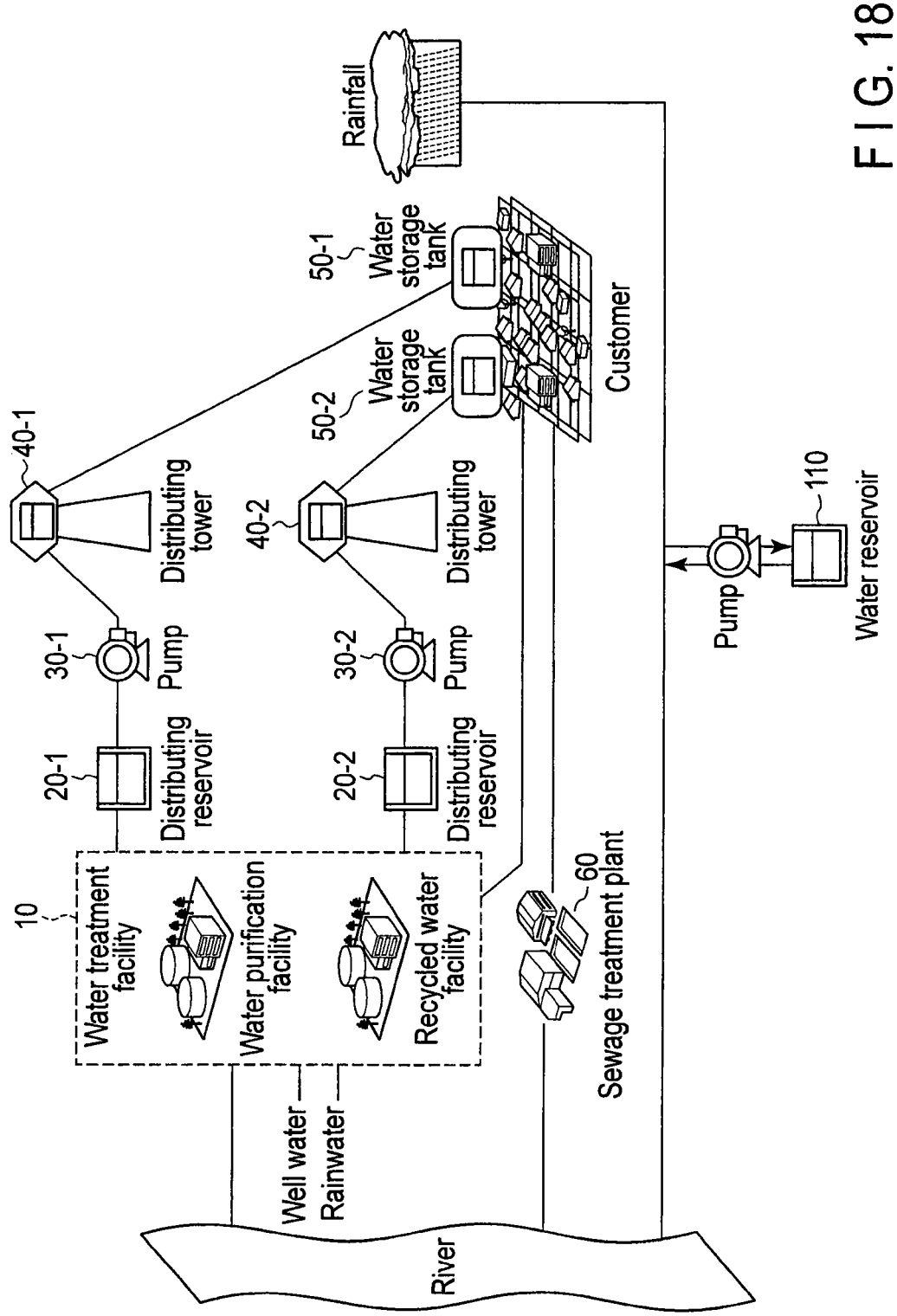
FIG. 18 is a diagram showing a configuration of a water and sewer system including a water treatment facility according to an eighth embodiment.

Sewage normally includes waste water drainage discharged by customers and rainwater drainage resulting from rainwater. A scheme for feeding sewage is roughly classified into two types. A first scheme is a separate sewer system in which waste water is treated at a sewage treatment plant using a soil pipe and in which rainwater is discharged directly into a river using a storm sewer, as shown in FIG. 18. A second scheme is a combined sewer system in which waste water and rainwater are fed to a sewage treatment plant through a single pipe, that is, a junction pipe, as shown in FIG. 19. As shown in FIG. 18 and FIG. 19, a water reservoir is often installed in a sewage infrastructure The water reservoir temporarily stores severely dirty rainwater during an initial stage of rainfall. A water reservoir used for the separate sewer system discharges the stored rainwater into a river when the rain stops. Furthermore, a water reservoir used for the combined sewer system discharges the stored rainwater to the sewage treatment plant when the rain stops and the sewage treatment plant has excess capacity needed to treat the rainwater. Additionally, the water reservoir may be used as a storage facility for mitigating flooding damage caused by heavy rainfall or the like.

An eighth embodiment to an eleventh embodiment describe water treatment systems using the water reservoir.

FIG. 20 is a diagram showing a configuration of a water treatment system according to the eighth embodiment. In FIG. 20, (c) denotes water quantity data on a clean water line transmitted by a sensor 81-1, (d) denotes water quantity data on a gray water line transmitted by a sensor 81-2, (o) denotes observation data transmitted by a radar rain gauge 120, (p) denotes an operation status transmitted by a sewage treatment plant 60, and (q) denotes storage control and discharge control performed on water reservoirs 110-1 to 110-3. The water treatment system shown in FIG. 20 comprises a water treatment facility 70, water storage tanks 50-1 and 50-2, the water quantity sensors 81-1 and 81-2, measurement apparatuses 91-1 and 91-2, a management terminal 103, water reservoirs 110-1 to 110-3, a radar rain gauge 120, and a monitoring control apparatus 130.

The water reservoir 110-1 to 110-3 store rainwater resulting from rainfall under the storage control of the monitoring control apparatus 130. In this case, the water reservoirs 110-1 to 110-3 undergo the storage control of the monitoring control apparatus 130 from the beginning of rainfall so that rainwater is stored in the water reservoir 110-3, the water reservoir 110-2, and the water reservoir 110-1 in this order. This allows relatively clean rainwater obtained within a given time from the beginning of the rainfall to be stored in the water reservoir 110-1.

The water reservoir 110-1 discharges the stored clean rainwater to a water purification facility 11 and/or a recycled water facility 12 under the discharge control of the monitoring control apparatus 130. The water reservoirs 110-2 and 110-3 discharge the stored rainwater to a sewage treatment plant 60 under the discharge control of the monitoring control apparatus 130.

The radar rain gauge 120 observes the state of rain clouds and the like to acquire observation data such as rainfall data and wind direction and velocity data. The radar rain gauge 120 transmits the acquired observation data to the monitoring control apparatus 130.

The monitoring control apparatus 130 is, for example, a cloud server comprising a plurality of servers. The monitoring control apparatus 130 is connected to the water treatment facility 70, the sensors 81-1 and 81-2, the water storage tanks 50-1 and 50-2, each home, the sewage treatment plant 60, the water reservoirs 110-1 to 110-3, and the radar rain gauge 120 by a network such as the Internet. The monitoring control apparatus 130 receives water quality data and water quantity data transmitted by the sensors 72-1 to 72-4, water quantity data transmitted by the sensors 51-1 and 51-2, the water quantity data transmitted by the sensors 81-1 and 81-2, the operation status transmitted by the sewage treatment plant 60, used quantity data transmitted by the measurement apparatuses 91-1 and 91-2, and the observation data transmitted by the radar rain gauge 120.

As shown in FIG. 21, the monitoring control apparatus 130 comprises a signal processor 131. The signal processor 131 includes, for example, a CPU and storage areas for programs and data needed for the CPU to carry out processing, such as a ROM and RAM. The signal processor 131 generates first water demand data indicative of a demand for clean water in a water supply area based on the used quantity data transmitted by the measurement apparatus 91-1 installed at each home. The signal processor 131 also generates second water demand data indicative of a demand for gray water in the water supply area based on the used quantity data transmitted by the measurement apparatus 91-2 installed at each home.

When the time of use pricing system is adopted, the signal processor 131 generates first water unit price information from the water unit price of clean water set based on past trends and the like, and transmits the generated first water unit price information to a management terminal 101 installed at each home. The signal processor 131 also generates second water unit price information from the water unit price of gray water set based on past trends and the like, and transmits the generated second water unit price information to the management terminal 103. Furthermore, when the real-time pricing system is adopted, the signal processor 131 generates first water unit price information based on first water demand data, and transmits the generated first water unit price information to the management terminal 103. The signal processor 131 also generates second water unit price information based on second water demand data, and transmits the generated second water unit price information to the management terminal 103.

The signal processor 131 references the quantity of water in the water storage tanks 50-1 and 50-2 determined based on the sensors 51-1 and 51-2, the qualities and quantities of water sources determined based on the sensors 72-1 to 72-4, and weather information obtained from the radar rain gauge 120 to determine the quantities of river water, well water, rainwater, and clean waste water to be treated in a water purification facility 11 and a recycled water facility 12 so as to minimize water treatment costs at the water purification facility 11 and the recycled water facility 12, while meeting the water demands indicated by the first and second water demand data. At this time, the determined quantity of rainwater to be treated in the water purification facility 11 and/or the recycled water facility 12 includes clean rainwater stored in the water reservoir 110-1. The signal processor 131 controls the water intake pumps 71-1 to 71-4, a water treatment control apparatus 13, the water storage tanks 50-1 and 50-2, and the water reservoir 110-1 so as to realize the determined quantities of water to be treated.

The signal processor 131 controls the water reservoirs 110-1 to 110-3 as follows.

The signal processor 131 performs the storage control on the water reservoirs 110-1 to 110-3 so that rainwater of a low water quality obtained within a given time from the beginning of rainfall is stored in the water reservoir 110-3 and the water reservoir 110-2, whereas clean rainwater obtained after the elapse of the given time from the beginning of rainfall is stored in the water reservoir 110-1. Furthermore, the signal processor 131 controls the water reservoir 110-1 in discharging clean rainwater so as to realize the quantity of rainwater to be treated in the water purification facility 11 and/or the recycled water facility 12.

The signal processor 131 references the operation status of the sewage treatment plant 60 transmitted by the sewage treatment plant 60 to determine whether or not the sewage treatment plant 60 has excess capacity needed to treat the rainwater. Upon determining that the sewage treatment plant 60 has excess capacity needed to treat the rainwater, the signal processor 131 performs the discharge control on the water reservoirs 110-2 and 110-3 so that the stored rainwater is discharged to the sewage treatment plant 60.

Furthermore, when a rainfall prediction indicates heavy rain, pretreatment is carried out in the water purification facility 11, the recycled water facility 12, and the sewage treatment plant 60 to reduce the quantity of water stored in grit chambers, sedimentation basins, and the water reservoirs. This enables more rainwater to be stored, allowing water damage such as river flooding to be suppressed.

As described above, the water treatment control apparatus 13 according to the eighth embodiment uses a recycled water facility 12 to treat clean waste water discharged by customers so as to make the waste water recyclable. This increases the number of water sources from which water can be taken, enabling water to be supplied to the customers even when, for example, there is insufficient water in rivers. Furthermore, the water treatment control apparatus 13 enables reduction and smoothing of treatment loads on a water purification facility 11 and a sewage treatment plant 60 compared to the conventional technique. This enables a reduction in the scales of the water purification facility 11 and the sewage treatment plant 60 compared to the conventional technique, allowing a reduction in facility costs and in the operation costs of the treatment plants.

Thus, the water treatment system according to the eighth embodiment can secure a quantity of water during drought and reduce sewage treatment costs at the sewage treatment plant.

Furthermore, in the water treatment system according to the eighth embodiment, the water treatment facility 70 treats clean rainwater stored in the water reservoir 110-1 by means of the water purification facility 11 and/or the recycled water facility 12, and supplies the treated rainwater to the water supply area. When the water reservoirs 110-1 to 110-3 are present, dirty rainwater can be stored in the water reservoirs 110-2 and 110-3 depending on the quantity of rain during rainfall. Thus, the water reservoir 110-1 can directly take relatively clean rainwater within the given time from the beginning of rainfall as a water source. The water treatment system can then utilize the clean rainwater stored in the water reservoir 110-1 as a water source after the rainfall.

Additionally, according to the eighth embodiment, the monitoring control apparatus 130 references the operation status of the sewage treatment plant 60, and when the operation status of the sewage treatment plant 60 indicates that the sewage treatment plant 60 has somewhat excess capacity, allows the water reservoirs 110-2 and 110-3 to discharge stored rainwater to the sewage treatment plant 60. This enables a reduction in the operation costs of the sewage treatment plant 60.

In addition, when a rainfall prediction indicates heavy rain, pretreatment is carried out in the water purification facility 11, the recycled water facility 12, and the sewage treatment plant 60 to reduce the quantity of water stored in the grit chambers, sedimentation basins, and water reservoirs. This enables more rainwater to be stored, allowing water damage such as river flooding to be suppressed.

[Ninth Embodiment]

FIG. 22 is a diagram showing a configuration of a water treatment system according to the ninth embodiment. In FIG. 22, (c) denotes water quantity data on a clean water line transmitted by a sensor 81-1, (d) denotes water quantity data on a gray water line transmitted by a sensor 81-2, (o) denotes observation data transmitted by a radar rain gauge 120, (p) denotes an operation status transmitted by a sewage treatment plant 60, and (r) denotes storage control and discharge control performed on water reservoirs 110-1 and 110-2. The water treatment system shown in FIG. 20 comprises a water treatment facility 70, water storage tanks 50-1 and 50-2, the water quantity sensors 81-1 and 81-2, measurement apparatuses 91-1 and 91-2, a management terminal 103, water reservoirs 110-1 and 110-2, a radar rain gauge 140, and a monitoring control apparatus 130.

The ninth embodiment is different from the eighth embodiment in that the radar rain gauge 140 comprises a phased array meteorological radar to three-dimensionally observe the quantity of moisture in the air. Thus, for example, a vertical integrated rainwater quantity can be calculated, enabling the quantity of rain in each of the areas within a predetermined range to be accurately predicted/measured in real time. The radar rain gauge 140 transmits observation data resulting from the prediction/measurement of the quantity of rain to the monitoring control apparatus 130.

As described above, a water treatment control apparatus 13 according to the ninth embodiment uses a recycled water facility 12 to treat clean waste water discharged by customers so as to make the waste water recyclable. This increases the number of water sources from which water can be taken, enabling water to be supplied to the customers even when, for example, there is insufficient water in rivers. Furthermore, the water treatment control apparatus 13 enables reduction and smoothing of treatment loads on a water purification facility 11 and a sewage treatment plant 60 compared to the conventional technique. This enables a reduction in the scales of the water purification facility 11 and the sewage treatment plant 60 compared to the conventional technique, allowing a reduction in facility costs and in the operation costs of the treatment plants.

Thus, the water treatment system according to the ninth embodiment can secure a quantity of water during drought and reduce sewage treatment costs at the sewage treatment plant.

Furthermore, the water treatment system according to the ninth embodiment comprises the radar rain gauge 140 with the phased array meteorological radar, which provides higher performance than the radar rain gauge 120, used in the water treatment system according to the eighth embodiment. Observation data obtained by the conventional radar rain gauge 120 does not accurately indicate how much rain is expected to fall in each observation area. Thus, according to the eighth embodiment, with the water reservoirs 110-1 to 110-3 provided to ensure somewhat excess capacity needed to treat rainwater, the monitoring control apparatus 130 performs the storage/discharge control on the water reservoirs 110-1 to 110-3. However, since the water treatment system according to the eighth embodiment provides somewhat excess capacity needed to treat rainwater, operation utilizing all of the installed capacities of the water reservoirs 110-1 to 110-3 is difficult. According to the ninth embodiment, the radar rain gauge 140 can measure the quantity of rain in each observation area in real time, and thus, the optimum operation can be achieved utilizing the installed capacities of the water reservoirs 110-1 and 110-2 exhaustively. For example, the water reservoirs, otherwise operated so as to utilize 80% of the installed capacities with 20% of the installed capacities reserved, can be operated so as to utilize 100% of the installed capacities. Hence, the water reservoirs 110-1 and 110-2 can store more water than the water reservoirs 110-1 to 110-3 according to the eighth embodiment. The operation, which is otherwise achieved by the water reservoirs 110-1 to 110-3, can be performed by the water reservoirs 110-1 and 110-2. Additionally, the ninth embodiment contributes to reducing facility and operation costs in association with the reduction of the water reservoirs. In addition, rainwater can be efficiently stored in the water reservoirs, enabling the water reservoirs to be downsized. This contributes to reducing the facility and operation costs in association with the downsized water reservoirs. Furthermore, the rain prediction is sophisticated to allow the monitoring control apparatus 130 to more efficiently control the operation of a water intake pump 71-3 that takes clean rainwater. Additionally, the sophisticated rain prediction allows the water treatment system to contribute to more efficiently operating the sewage treatment plant 60.

[Tenth Embodiment]

FIG. 23 is a diagram showing a configuration of a water treatment system according to the tenth embodiment. In FIG. 23, (c) denotes water quantity data on a clean water line transmitted by a sensor 81-1, (d) denotes water quantity data on a gray water line transmitted by a sensor 81-2, (o) denotes observation data transmitted by a radar rain gauge 120, (p) denotes an operation status transmitted by a sewage treatment plant 60, (r) denotes storage control and discharge control performed on water reservoirs 110-1 and 110-2, and (s) denotes pump control performed on a water intake pump 111-1 and a water feed pump 111-2. The water treatment system shown in FIG. 23 comprises a water treatment facility 70, water storage tanks 50-1 and 50-2, the water quantity sensors 81-1 and 81-2, measurement apparatuses 91-1 and 91-2, a management terminal 103, the water reservoirs 110-1 and 110-2, a radar rain gauge 140, and a monitoring control apparatus 150.

The water reservoir 110-1 is provided with the water intake pump 111-1 and the water feed pump 111-2. The water intake pump 111-1 takes clean rainwater under the control of the monitoring control apparatus 150. The water feed pump 111-2 feeds clean rainwater discharged from the water reservoir 110-1 to a water purification facility 11 and/or a recycled water facility 12 under the control of the monitoring control apparatus 150.

The radar rain gauge 140 comprises a phased array meteorological radar to three-dimensionally observe the quantity of moisture in the air. Thus, for example, a vertical integrated rainwater quantity can be calculated, enabling a rainfall area, a rainfall time, and precipitation to be accurately predicted/measured in real time. The radar rain gauge 140 transmits observation data resulting from the prediction/ measurement of the rainfall area, rainfall time, and precipitation to the monitoring control apparatus 150.

The monitoring control apparatus 150 is, for example, a cloud server comprising a plurality of servers. The monitoring control apparatus 150 is connected to the water treatment facility 70, the sensors 81-1 and 81-2, the water storage tanks 50-1 and 50-2, each home, the sewage treatment plant 60, the water reservoirs 110-1 to 110-3, and the radar rain gauge 140 by a network such as the Internet. The monitoring control apparatus 150 receives water quality data and water quantity data transmitted by the sensors 72-1 to 72-4, water quantity data transmitted by the sensors 51-1 and 51-2, the water quantity data transmitted by the sensors 81-1 and 81-2, the operation status transmitted by the sewage treatment plant 60, used quantity data transmitted by the measurement apparatuses 91-1 and 91-2, and the observation data transmitted by the radar rain gauge 140.

As shown in FIG. 24, the monitoring control apparatus 150 comprises a signal processor 151. The signal processor 151 includes, for example, a CPU and storage areas for programs and data needed for the CPU to carry out processing, such as a ROM and RAM. The signal processor 151 generates first water demand data indicative of a demand for clean water in a water supply area based on the used quantity data transmitted by the measurement apparatus 91-1 installed at each home. The signal processor 151 also generates second water demand data indicative of a demand for gray water in the water supply area based on the used quantity data transmitted by the measurement apparatus 91-2 installed at each home.

When the time of use pricing system is adopted, the signal processor 151 generates first water unit price information from the water unit price of clean water set based on past trends and the like, and transmits the generated first water unit price information to the management terminal 103 installed at each home. The signal processor 151 also generates second water unit price information from the water unit price of gray water set based on past trends and the like, and transmits the generated second water unit price information to the management terminal 103. Furthermore, when the real-time pricing system is adopted, the signal processor 151 generates first water unit price information based on first water demand data, and transmits the generated first water unit price information to the management terminal 103. The signal processor 151 also generates second water unit price information based on second water demand data, and transmits the generated second water unit price information to the management terminal 103.

The signal processor 151 references the rainfall area, rainfall time, and precipitation predicted/measured by the radar rain gauge 140 to estimate the quality and quantity of rainwater at each water intake point at each time of day. The signal processor 151 references the results of the estimation of the quality and quantity of rainwater at each time of day to control the water intake pump 111-1 so that the water intake pump 111-1 takes clean rainwater obtained within a given time from the beginning of rainfall. Furthermore, the signal processor 151 performs storage control on the water reservoir 110-1 so that the taken clean rainwater is stored in the water reservoir 110-1. Additionally, the signal processor 151 performs storage control on the water reservoir 110-2 so that dirty rainwater is stored in the water reservoir 110-2.

The signal processor 151 references the quantity of water in the water storage tanks 50-1 and 50-2 determined based on the sensors 51-1 and 51-2, the qualities and quantities of water sources determined based on the sensors 72-1 to 72-4, and weather information obtained from the radar rain gauge 140 to determine the quantities of river water, well water, rainwater, and clean waste water to be treated in a water purification facility 11 and a recycled water facility 12 so as to minimize water treatment costs at the water purification facility 11 and the recycled water facility 12, while meeting the water demands indicated by the first and second water demand data. At this time, the determined quantity of rainwater to be treated in the water purification facility 11 and/or the recycled water facility 12 includes clean rainwater stored in the water reservoir 110-1. The signal processor 151 controls the water intake pumps 71-1 to 71-4, a water treatment control apparatus 13, the water storage tanks 50-1 and 50-2, the water reservoirs 110-1, and the water feed pump 111-2 so as to realize the determined quantities of water to be treated.

The signal processor 151 references the operation status of the sewage treatment plant 60 transmitted by the sewage treatment plant 60 to determine whether or not the sewage treatment plant 60 has excess capacity needed to treat the rainwater. Upon determining that the sewage treatment plant 60 has excess capacity sufficient to treat the rainwater, the signal processor 151 performs the discharge control on the water reservoir 110-2 so that the stored rainwater is discharged to the sewage treatment plant 60.

As described above, the water treatment control apparatus 13 according to the tenth embodiment uses a recycled water facility 12 to treat clean waste water discharged by customers so as to make the waste water recyclable. This increases the number of water sources from which water can be taken, enabling water to be supplied to the customers even when, for example, there is insufficient water in rivers. Furthermore, the water treatment control apparatus 13 enables reduction and smoothing of treatment loads on a water purification facility 11 and a sewage treatment plant 60 compared to the conventional technique. This enables a reduction in the scales of the water purification facility 11 and the sewage treatment plant 60 compared to the conventional technique, allowing a reduction in facility costs and in the operation costs of the treatment plants.

Thus, the water treatment system according to the tenth embodiment can secure a quantity of water during drought and reduce sewage treatment costs at the sewage treatment plant.

Furthermore, the water treatment system according to the tenth embodiment comprises the radar rain gauge 140 with the phased array meteorological radar, which provides higher performance than the radar rain gauge 120, used in the water treatment system according to the eighth embodiment. The monitoring control apparatus 150 controls the water intake pump 111-1 so that the water intake pump 111-1 takes clean rainwater, based on the rainfall area, rainfall time, and precipitation predicted/measured by the radar rain gauge 140. Thus, the monitoring control apparatus 150 can more efficiently store clean rainwater in the water reservoir 110-1.

The tenth embodiment has been described taking, as an example, the case where clean rainwater is stored in the water reservoir 110-1. However, the water reservoir in which clean rainwater is stored is not limited to the water reservoir 110-1. Taking the distance between the rainfall area and the water reservoir into account, the signal processor 151 may control the water intake pump 111-1 so that clean rainwater is stored in a water reservoir closest to the rainfall area.

[Eleventh Embodiment]

In the water treatment systems according to the eighth to tenth embodiments the water reservoir 110 stores rainwater during rainfall and discharges the stored rainwater after the rain stops. However, rainwater fails to enter and exit the water reservoir 110 except during the storage/discharge of rainwater resulting from rainfall. On the other hand, customers constantly discharge dirty waste water, and a sewage treatment plant 60 treats the discharged dirty waste water.

It has been found that the quantities of water demanded and discharged by the customer have a tendency. The tendency of the quantities of water demand and waste water is as shown in FIG. 25; the quantities have a peak both in the morning and in the evening. In the present embodiment, a water treatment system will be described which can flatten the quantity of waste water discharged by the customer by storing clean waste water and dirty waste water in the water reservoir when the water reservoir has excess capacity.

Figure 26:
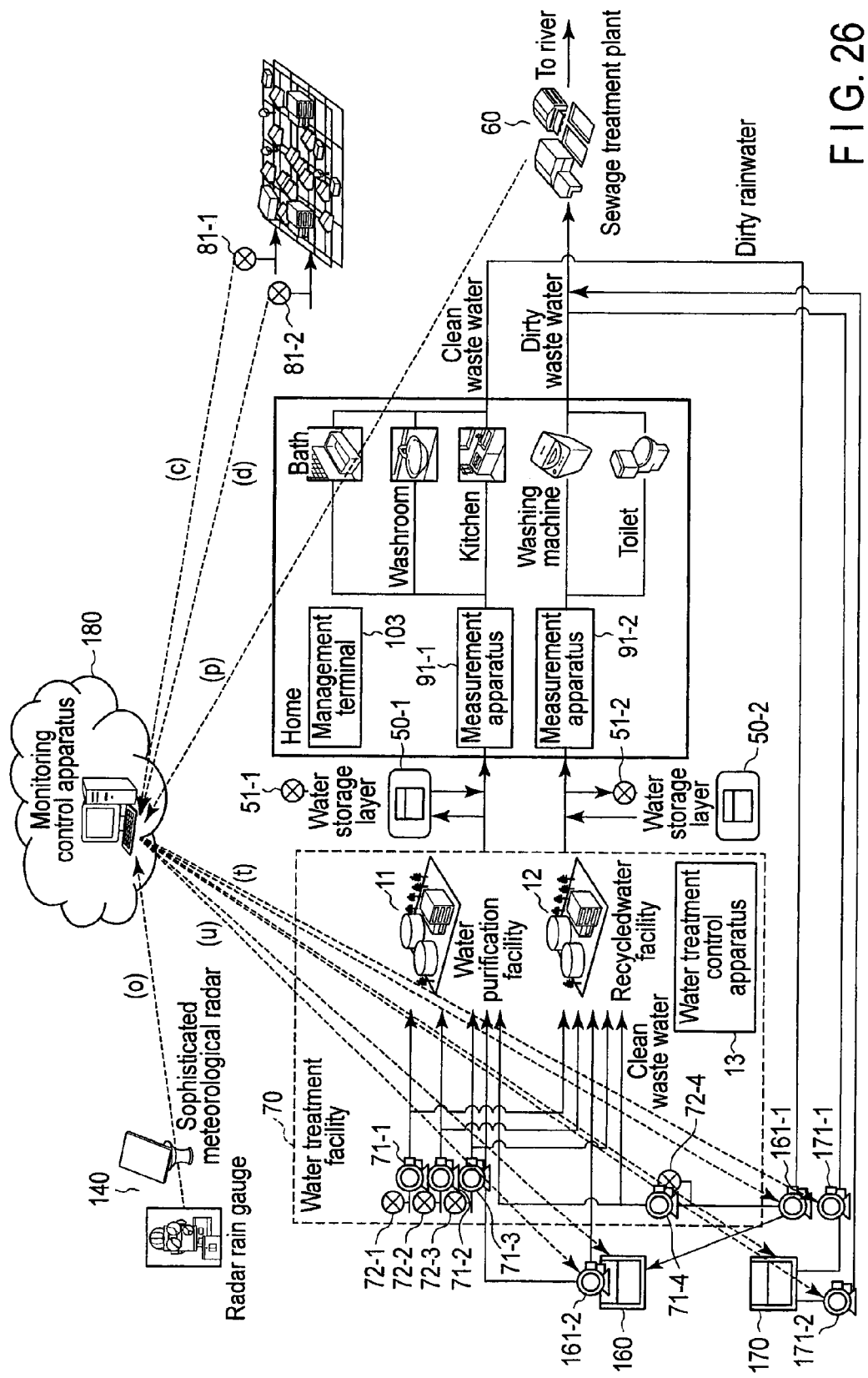
FIG. 26 is a diagram showing a configuration of a water treatment system according to an eleventh embodiment.

FIG. 26 is a diagram showing a configuration of a water treatment system according to the eleventh embodiment. In FIG. 26, (c) denotes water quantity data on a clean water line transmitted by a sensor 81-1, (d) denotes water quantity data on a gray water line transmitted by a sensor 81-2, (o) denotes observation data transmitted by a radar rain gauge 120, (p) denotes an operation status transmitted by a sewage treatment plant 60, (t) denotes storage control and discharge control performed on water reservoirs 160 and 170, and (u) denotes pump control performed on water intake pumps 161-1 and 171-1 and water feed pumps 161-2 and 171-2. The water treatment system shown in FIG. 26 comprises a water treatment facility 70, water storage tanks 50-1 and 50-2, the water quantity sensors 81-1 and 81-2, measurement apparatuses 91-1 and 91-2, a management terminal 103, the water reservoirs 160 and 170, a radar rain gauge 140, and a monitoring control apparatus 180.

The water reservoir 160 is provided with the water intake pump 161-1 and the water feed pump 161-2. The water intake pump 161-1 takes clean rainwater under the control of the monitoring control apparatus 180. The water feed pump 161-2 feeds clean rainwater discharged from the water reservoir 160 to a water purification facility 11 and/or a recycled water facility 12 under the control of the monitoring control apparatus 180.

The clean waste water taken by the water intake pump 161-1 is stored in the water reservoir 160 under the storage control of the monitoring control apparatus 180. The water reservoir 160 discharges the stored clean waste water to the water purification facility 11 and/or the recycled water facility 12 under the discharge control of the monitoring control apparatus 180.

The water reservoir 170 is provided with the water intake pump 171-1 and the water feed pump 171-2. The water intake pump 171-1 takes dirty rainwater under the control of the monitoring control apparatus 180. The water feed pump 171-2 feeds dirty rainwater discharged from the water reservoir 170 to the sewage treatment plant 60 under the control of the monitoring control apparatus 180.

The dirty waste water taken by the water intake pump 171-1 is stored in the water reservoir 170 under the storage control of the monitoring control apparatus 180. The water reservoir 170 discharges the stored dirty waste water to the sewage treatment plant 60 under the discharge control of the monitoring control apparatus 180.

The monitoring control apparatus 180 is, for example, a cloud server comprising a plurality of servers. The monitoring control apparatus 180 is connected to the water treatment facility 70, the sensors 81-1 and 81-2, the water storage tanks 50-1 and 50-2, each home, the sewage treatment plant 60, the water reservoirs 160 and 170, and the radar rain gauge 140 by a network such as the Internet. The monitoring control apparatus 180 receives water quality data and water quantity data transmitted by the sensors 72-1 to 72-4, water quantity data transmitted by the sensors 51-1 and 51-2, the water quantity data transmitted by the sensors 81-1 and 81-2, the operation status transmitted by the sewage treatment plant 60, used quantity data transmitted by the measurement apparatuses 91-1 and 91-2, and the observation data transmitted by the radar rain gauge 140.

As shown in FIG. 27, the monitoring control apparatus 180 comprises a signal processor 181. The signal processor 181 includes, for example, a CPU and storage areas for programs and data needed for the CPU to carry out processing, such as a ROM and RAM. The signal processor 181 generates first water demand data indicative of a demand for clean water in a water supply area based on the used quantity data transmitted by the measurement apparatus 91-1 installed at each home. The signal processor 181 also generates second water demand data indicative of a demand for gray water in the water supply area based on the used quantity data transmitted by the measurement apparatus 91-2 installed at each home.

When the time of use pricing system is adopted, the signal processor 181 generates first water unit price information from the water unit price of clean water set based on past trends and the like, and transmits the generated first water unit price information to the management terminal 103 installed at each home. The signal processor 181 also generates second water unit price information from the water unit price of gray water set based on past trends and the like, and transmits the generated second water unit price information to the management terminal 103. Furthermore, when the real-time pricing system is adopted, the signal processor 181 generates first water unit price information based on first water demand data, and transmits the generated first water unit price information to the management terminal 103. The signal processor 181 also generates second water unit price information based on second water demand data, and transmits the generated second water unit price information to the management terminal 103.

The signal processor 181 references a rainfall area, a rainfall time, and precipitation predicted/measured by the radar rain gauge 140 to determine that no rainwater is stored in the water reservoir 160. Upon determining that no rainwater is stored in the water reservoir 160, the signal processor 181 controls the water intake pump 161-1 so that the water intake pump 161-1 takes clean waste water discharged from homes. The signal processor 181 also controls the water reservoir 160 so that the taken clean waste water is stored in the water reservoir 160.

Furthermore, the signal processor 181 references the rainfall area, rainfall time, and precipitation predicted/measured by the radar rain gauge 140 to determine that no rainwater is stored in the water reservoir 170. The signal processor 181 also references the operation status transmitted by the sewage treatment plant 60 to determine that the quantity of water treated in the sewage treatment plant 60 has reached the limit thereof. Upon determining that no rainwater is stored in the water reservoir 170 and that the quantity of water treated in the sewage treatment plant 60 has reached the limit thereof, the signal processor 181 controls the water intake pump 171-1 so that the water intake pump 171-1 takes dirty waste water discharged from the homes. The signal processor 181 also performs the storage control on the water reservoir 170 so that the taken dirty waste water is stored in the water reservoir 170.

The signal processor 181 references the quantity of water in the water storage tanks 50-1 and 50-2 determined based on the sensors 51-1 and 51-2, the qualities and quantities of water sources determined based on the sensors 72-1 to 72-4, and weather information obtained from the radar rain gauge 120 to determine the quantities of river water, well water, rainwater, and clean waste water to be treated in a water purification facility 11 and a recycled water facility 12 so as to minimize water treatment costs at the water purification facility 11 and the recycled water facility 12, while meeting the water demands indicated by the first and second water demand data. At this time, the determined quantity of clean waste water to be treated in the water purification facility 11 and/or the recycled water facility 12 includes clean waste water stored in the water reservoir 160. The signal processor 181 controls the water intake pumps 71-1 to 71-4, a water treatment control apparatus 13, the water storage tanks 50-1 and 50-2, the water reservoir 160, and the water feed pump 161-2 so as to realize the determined quantities of water to be treated.

The signal processor 181 references the operation status of the sewage treatment plant 60 transmitted by the sewage treatment plant 60 to determine whether or not the sewage treatment plant 60 has excess capacity sufficient to treat dirty waste water. Upon determining that the sewage treatment plant 60 has excess capacity sufficient to treat the dirty waste water, the signal processor 181 performs the discharge control on the water reservoir 170 so that the stored dirty waste water is discharged to the sewage treatment plant 60. The signal processor 181 also controls the water feed pump 171-2 so that waste water discharged from the water reservoir 170 is fed to the sewage treatment plant 60.

As described above, the water treatment control apparatus 13 according to the tenth embodiment uses a recycled water facility 12 to treat clean waste water discharged by the customer so as to make the waste water recyclable. This increases the number of water sources from which water can be taken, enabling water to be supplied to the customer even when, for example, there is insufficient water in rivers.

Furthermore, the water treatment control apparatus 13 enables reduction and smoothing of treatment loads on a water purification facility 11 and a sewage treatment plant 60 compared to the conventional technique. This enables a reduction in the scales of the water purification facility 11 and the sewage treatment plant 60 compared to the conventional technique, allowing a reduction in facility costs and in the operation costs of the treatment plants.

Thus, the water treatment system according to the eleventh embodiment can secure a quantity of water during drought and reduce sewage treatment costs at the sewage treatment plant.

Furthermore, in the water treatment system according to the eleventh embodiment, if no rainwater is stored in the water reservoir 160 or 170, the monitoring control apparatus 180 stores clean waste water and dirty waste water in the water reservoirs 160 and 170, respectively. The monitoring control apparatus 180 then treats the clean waste water stored in the water reservoir 160 as a water source for the water treatment facility 70. This increases the number of water sources from which water can be taken, enabling water to be supplied even when, for example, there is insufficient water in rivers.

Additionally, the monitoring control apparatus 180 discharges the dirty waste water stored in the water reservoir 170 to the sewage treatment plant 60 when the sewage treatment plant 60 has extra capacity sufficient to treat the waste water. This enables flattening of the quantity of dirty waste water discharged by the customer as seen from the sewage treatment plant 60 as shown in FIG. 28. Since the quantity of waste water can thus be flattened, the scales of the sewage treatment plant 60 or the facility and operation costs can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A water treatment system configured to control a water treatment facility including a water purification facility configured to treat taken water and to feed the treated water to a customer through a clean water line as clean water and a recycled water facility configured to treat taken water and to feed the treated water to the customer through a gray water line as gray water, the water treatment system comprising:
    a monitoring control apparatus configured to acquire a first water demand for the clean water in a water supply area in which the customer is present based on a quantity of the clean water fed to the water supply area, to acquire a second water demand for the gray water in the water supply area based on a quantity of the gray water fed to the water supply area, to acquire qualities and quantities of a plurality of types of water including river water from a river, rainwater, and waste water used by the customer, and to determine quantities of the plurality of types of water to be treated in the water treatment facility at the water treatment facility while meeting the first and second water demands referring to the qualities and quantities; and
    a water treatment control apparatus configured to generate a first indication, to the water purification facility, of a type of water to be taken by the water purification facility referring to the quantities of treated water determined by the monitoring control apparatus, and to generate a second indication, to the recycled water facility, of a type of water to be taken by the recycled water facility referring to the quantities of treated water determined by the monitoring control apparatus;
    wherein the monitoring control apparatus is configured to generate first water unit price information on a change in a water unit price of the clean water and second water unit price information on a change in a water unit price of the gray water and to distribute the first and second water unit price information to a management terminal configured to control operation of a user facility.

2. The water treatment system according to claim 1, wherein the management terminal is configured to supply the clean water or the gray water to the user facility in accordance with an instruction input by the customer depending on display of the first and second water unit price information.

3. The water treatment system according to claim 1, wherein the management terminal is configured to operate the user facility at a time of day when the water unit price of the clean water or the gray water used by the facility is less than a specified value based on the received first and second water unit price information.

4. The water treatment system according to claim 3, wherein the management terminal is configured to supply the clean water or the gray water to the user facility to reduce a charge for the clean water or the gray water used by the facility based on the first and second water unit price information.

5. The water treatment system according to claim 1, wherein the management terminal is configured to estimate water quality of waste water from the user facility and to selectively determine whether to feed the waste water to the water treatment facility or to a sewage treatment plant based on a result of the estimation.

6. A water treatment system configured to control a water treatment facility including a water purification facility configured to treat taken water and to feed the treated water to a customer through a clean water line as clean water and a recycled water facility configured to treat taken water and to feed the treated water to the customer through a gray water line as gray water, the water treatment system comprising:
    a monitoring control apparatus configured to acquire a first water demand for the clean water in a water supply area in which the customer is present based on a quantity of the clean water fed to the water supply area, to acquire a second water demand for the gray water in the water supply area based on a quantity of the gray water fed to the water supply area, to acquire qualities and quantities of a plurality of types of water including river water from a river, rainwater, and waste water used by the customer, and to determine quantities of the plurality of types of water to be treated in the water treatment facility at the water treatment facility while meeting the first and second water demands referring to the qualities and quantities; and
    a water treatment control apparatus configured to generate a first indication, to the water purification facility, of a type of water to be taken by the water purification facility referring to the quantities of treated water determined by the monitoring control apparatus, and to generate a second indication, to the recycled water facility, of a type of water to be taken by the recycled water facility referring to the quantities of treated water determined by the monitoring control apparatus;

wherein the monitoring control apparatus is configured to generate first water unit price information on a change in a water unit price of the clean water and second water unit price information on a change in a water unit price of the gray water and to distribute the first and second water unit price information to a management terminal configured to control operation of a user facility;

wherein the monitoring control apparatus is configured to determine quantities of the plurality of types of water treated in the water purification facility and the recycled water facility referring to weather information observed by a radar rain gauge, and the monitoring control apparatus is further configured to store rainwater obtained within a given time from beginning of rainfall in one of a plurality of water reservoirs configured to store rainwater and to allow a water reservoir in which rainwater obtained after elapse of the given time is stored to discharge the rainwater to the water purification facility and the recycled water facility in such a manner as to realize the quantity of rainwater to be treated.

7. The water treatment system according to claim 6, wherein the radar rain gauge comprises a phased array meteorological radar configured to observe a quantity of moisture in air.

8. The water treatment system according to claim 6, wherein the monitoring control apparatus is configured to store the rainwater obtained within the given time from the beginning of rainfall in one of the plurality of water reservoirs and to allow the water reservoir in which the rainwater obtained within the given time from the beginning of rainfall is stored to discharge the rainwater to a sewage treatment plant based on an operation status of the sewage treatment plant.

9. The water treatment system according to claim 6, wherein the monitoring control apparatus is configured to store waste water used by the customer in one of the plurality of water reservoirs upon determining that a treatment load greater than a specified value is imposed on the sewage treatment plant and to allow the water reservoir in which the waste water used by the customer is stored to discharge the waste water to the sewage treatment plant upon determining that the treatment load on the sewage treatment plant reduces.

* * * * *